US012745115B2

(12) United States Patent
Luo et al.

(10) Patent No.: US 12,745,115 B2
(45) Date of Patent: Sep. 22, 2026

(54) ACCESS POINT DEVICE, STATION DEVICE, AND METHOD FOR WIRELESS COMMUNICATION

(71) Applicant: GUANGDONG OPPO MOBILE TELECOMMUNICATIONS CORP., LTD., Dongguan (CN)

(72) Inventors: Chaoming Luo, Dongguan (CN); Lei Huang, Singapore (SG)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 269 days.

(21) Appl. No.: 18/587,755

(22) Filed: Feb. 26, 2024

(65) Prior Publication Data

US 2024/0205710 A1 Jun. 20, 2024

Related U.S. Application Data

(63) Continuation of application No. PCT/CN2021/136468, filed on Dec. 8, 2021.

(30) Foreign Application Priority Data

Aug. 30, 2021 (WO) ................ PCT/CN2021/115476

(51) Int. Cl.
*H04W 24/08* (2009.01)
*H04W 88/08* (2009.01)

(52) U.S. Cl.
CPC ............ *H04W 24/08* (2013.01); *H04W 88/08* (2013.01)

(58) Field of Classification Search
CPC ..... H04W 24/08; H04W 88/08; H04W 84/12; H04W 24/02
See application file for complete search history.

(56) References Cited

U.S. PATENT DOCUMENTS

2006/0126798 A1 6/2006 Conway
2016/0234831 A1 8/2016 Tian et al.
(Continued)

FOREIGN PATENT DOCUMENTS

CN 102197672 A 9/2011
CN 105611567 A 5/2016
(Continued)

OTHER PUBLICATIONS

Second Office Action and search report of the Chinese patent application No. 202180099147.9, mailed on Mar. 22, 2025.
(Continued)

*Primary Examiner* — Rina C Pancholi
(74) *Attorney, Agent, or Firm* — Ladas & Parry, LLP

(57) ABSTRACT

An access point (AP) device, a station device, and a method for wireless communication are provided. The AP device includes a processor, a transceiver and a memory. The memory is configured to store a computer program, and the processor is configured to invoke and run the computer program stored in the memory to control the transceiver to send at least one sensing measurement configuration to a first station (STA) device. The sensing measurement configuration is used for configuring operational parameters of a sensing measurement, and the sensing measurement configuration includes the operational parameters of the sensing measurement, and/or an identification of the sensing measurement configuration.

20 Claims, 10 Drawing Sheets

(56) References Cited

U.S. PATENT DOCUMENTS

| | | | | |
|---|---|---|---|---|
| 2017/0171895 | A1 | 6/2017 | Kandagadla | |
| 2020/0359248 | A1* | 11/2020 | Sadeghi | H04W 74/0808 |
| 2021/0076367 | A1* | 3/2021 | Bayesteh | H04W 4/70 |
| 2024/0155702 | A1* | 5/2024 | Du | H04W 24/08 |

FOREIGN PATENT DOCUMENTS

| | | | |
|---|---|---|---|
| CN | 112218328 | A | 1/2021 |
| CN | 112689300 | A | 4/2021 |
| CN | 112738758 | A | 4/2021 |
| CN | 112804662 | A | 5/2021 |
| CN | 113115341 | A | 7/2021 |
| CN | 113132917 | A | 7/2021 |
| WO | 2017024568 | A | 2/2017 |
| WO | 2023028791 | A1 | 3/2023 |

OTHER PUBLICATIONS

International Search Report in the international application No. PCT/CN2021/136468, mailed on Mar. 28, 2022.

Written Opinion of the International Search Authority in the international application No. PCT/CN2021/136468, mailed on Mar. 28, 2022.

International Search Report in the international application No. PCT/CN2021/115476, mailed on Feb. 16, 2022.

Written Opinion of the International Search Authority in the international application No. PCT/CN2021/115476, mailed on Feb. 16, 2022.

Part 11: Wireless LAN Medium Access Control (MAC) and Physical Layer (PHY) Specifications, IEEE Std 802.11™-2020 (Revision of IEEE Std 802.11-2016), Developed by the LAN/MAN Standards Committee, the whole document, 1-2499.

Cheng Chen, Intel, “Overview of WLAN sensing protocol”, doc.: IEEE 802.11-20/1232r0, Date: Aug. 16, 2020, the whole document, 11 pages.

Insun Jang, LG Electronics, “Discussion on WLAN Sensing Procedure”, doc.: IEEE 802.11-20/1804r1, Date: Nov. 9, 2020, the whole document, 13 pages.

Cheng Chen, Intel, “Wi-Fi Sensing Definitions”, doc.: IEEE 802. 11-20/1849r4, Date: Nov. 15, 2020, the whole document, 15 pages.

Rui Du, et al. (Huawei), “Definitions and scenarios of the WLAN sensing-follow ups”, doc.: IEEE 802.11-21/0147r3, Date: Jan. 26, 2021, the whole document, 21 pages.

Cheng Chen, Intel, “Overview of Wi-Fi sensing protocol”, doc.: IEEE 802.11-20/1851r3, Date: Nov. 12, 2020, the whole document, 12 pages.

Halise Türkmen, Vestel, “Wi-Fi Sensing Parameters”, doc.: IEEE 802.11-21/0365r1, Date: Mar. 3, 2021, the whole document, 10 pages.

Claudio da Silva, Intel, “Discussion of Sensing Measurement Result Types”, doc.: IEEE 802.11-21/0357r0, Date: Mar. 5, 2020, the whole document, 11 pages.

Jay Yang, et al. (Nokia), “TXOP Sharing for use in MU P2P”, Doc.: IEEE 802.11-20/1938r5, Date: Apr. 19, 2021, the whole document, 8 pages.

Solomon Trainin, Qualcomm, “WLAN Sensing procedure”, Doc.: IEEE 802.11-21/1321r0, Date: Aug. 2, 2021, the whole document, 8 pages.

Solomon Trainin, Qualcomm, “WLAN sensing procedure”, Doc.: IEEE 802.11-21/1322r0, Date: Aug. 9, 2021, the whole document, 5 pages.

Solomon Trainin, Qualcomm, “Sensing session and measurement exchange identification”, doc.: IEEE 802.11-21/0644r3, Date: May 10, 2021, the whole document, 14 pages.

Part 11: Wireless LAN Medium Access Control (MAC) and Physical Layer (PHY) Specifications, IEEE Std 802.11™-2020 (Revision of IEEE Std 802.11-2016), Developed by the LAN/MAN Standards Committee, the whole document, 2500-4377.

Supplementary European Search Report in the European patent application No. 21955804.6, mailed on Oct. 30, 2024.

Tong LIU et al., “A network information-aware roaming scheme in WLAN”, Electronic Design Engineering, vol. 28, No. 9, May 5, 2020, pp. 88-93.

Moderator (Qualcomm Incorporated), “Email discussion summary for channel access mechanism for 52.6GHZ-71GHz band, ver02”, 3GPP TSG RAN WG1 Meeting #104-e, R1-2102081, Jan. 25-Feb. 5, 2021.

First Office Action and search report of the Chinese application No. 202180099147.9, issued on Jan. 13, 2025 with its English translation.

* cited by examiner

ACCESS POINT DEVICE, STATION DEVICE, AND METHOD FOR WIRELESS COMMUNICATION

CROSS-REFERENCE TO RELATED APPLICATIONS

This application is a continuation application of International Patent Application No. PCT/CN2021/136468, filed on Dec. 8, 2021, which claims priority to International Patent Application No. PCT/CN2021/115476 filed on Aug. 30, 2021 and entitled "WIRELESS COMMUNICATION METHOD AND DEVICE", the contents of which are hereby incorporated by reference in their entireties.

BACKGROUND

Sensing measurement is a function enhancement of the 802.11 protocol proposed based on 802.11 bf standards. The sensing measurement measures and senses surrounding environment through wireless signals, to detect whether there are someone invading, moving, falling in the indoor environment, or do gesture recognition, or do establishment of spatial three-dimensional images.

There is no discussion in the related art on how to perform a sensing measurement configuration, such as how to set up the sensing measurement configuration and how to terminate the sensing measurement configuration.

SUMMARY

The disclosure relates to the field of communication, and in particular to an access point (AP) device, a station device, and a method for wireless communication.

The access point (AP) device may send at least one sensing measurement configuration to participants of sensing measurement, and further, the participants may perform sensing measurement based on the sensing measurement configuration.

A first aspect of the embodiments provides an access point (AP) device, which includes a processor, a transceiver and a memory. The memory is configured to store a computer program, and the processor is configured to invoke and run the computer program stored in the memory to control the transceiver to send at least one sensing measurement configuration to a first station (STA) device. The sensing measurement configuration is used for configuring operational parameters of a sensing measurement, and the sensing measurement configuration includes the operational parameters of the sensing measurement, and/or an identification of the sensing measurement configuration.

A second aspect of the embodiments provides a station (STA) station, which includes a processor, a transceiver and a memory. The memory is configured to store a computer program, and the processor is configured to invoke and run the computer program stored in the memory to control the transceiver to receive at least one sensing measurement configuration sent by an access point (AP) device. The sensing measurement configuration is used for configuring operational parameters of a sensing measurement, and the sensing measurement configuration comprises the operational parameters of the sensing measurement and/or an identification of the sensing measurement configuration.

A third aspect of the embodiments provides a method for wireless communication including following operations. At least one sensing measurement configuration sent by an access point (AP) device is received by a first station (STA) device. The sensing measurement configuration is used for configuring operational parameters of a sensing measurement, and the sensing measurement configuration includes the operational parameters of the sensing measurement and/or an identification of the sensing measurement configuration.

DETAILED DESCRIPTION

The technical solutions in the embodiments of the disclosure are described in the following with reference to the accompanying drawings in the embodiments of the disclosure. It is obvious that the described embodiments are some rather than all of the embodiments of the disclosure. All other embodiments obtained by a person of ordinary skill in the art based on the embodiments of the disclosure without creative efforts shall fall within the protection scope of the disclosure.

The technical solutions in the embodiments of the disclosure may be applied to various communication systems, such as wireless local area networks (WLAN), wireless fidelity (WiFi) or other communication systems.

Figure 1:
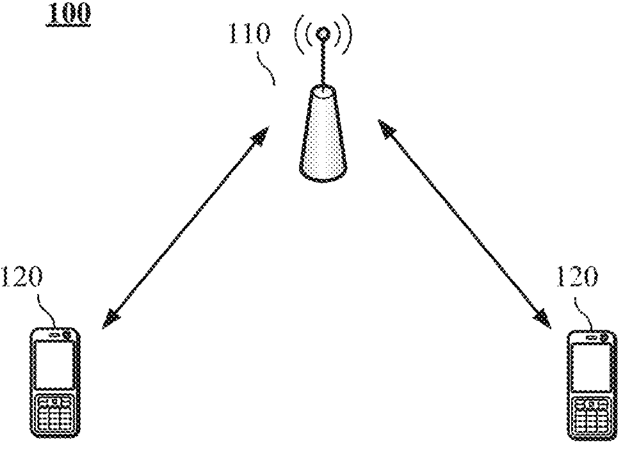
FIG. 1 is a schematic diagram of architecture of a communication system according to an embodiment of the disclosure.

Exemplarily, a communication system 100 applied in the embodiments of the disclosure is shown in FIG. 1. The communication system 100 may include an access point (AP) 110 and a station (STA) 120 which accesses a network through the AP 110.

In an embodiment of the disclosure, the STA may be a mobile phone, a tablet computer (Pad), a computer having wireless transceiver function, a virtual reality (VR) device, an augmented reality (AR) device, a wireless device in industrial control, a wireless device in self driving, a wireless device in remote medical, a wireless device in smart grid, a wireless device in transportation safety, a wireless device in smart city or a wireless device in smart home, and the like.

FIG. 1 exemplarily illustrates one AP and two STAs. Optionally, the communication system 100 may include multiple APs and other numbers of STAs, which are not limited in the embodiments of the disclosure.

It should be understood that a device with a communication function in networks/systems in the embodiments of the disclosure may be referred as a communication device. Taking the communication system 100 shown in FIG. 1 as an example, the communication device may include an AP 110 with a communication function and STAs 120. The AP 110 and the STAs 120 may be the specific devices described above, and are not repeated here. The communication device may further include other devices in the communication system 100, such as a network controller, a gateway and other network entities, which are not limited in the embodiments of the disclosure.

It should be understood that terms "system" and "network" are often used interchangeably in the disclosure. A term "and/or" herein is only an association relationship describing associated objects, and indicates that there may be three relationships. For example, A and/or B may indicate three cases: existence of A alone, existence of A and B simultaneously, and existence of B alone. Furthermore, a character "/" in the disclosure generally indicates that associated objects are in an "or" relationship.

It should be understood that "indicate" mentioned in the embodiments of the disclosure may be a direct indication or an indirect indication, or may mean that there is an association relationship. For example, A indicates B, which may mean that A indicates B directly (e.g. B may be acquired through A), or may mean that A indicates B indirectly (e.g. A indicates C, and B may be acquired through C), or may mean that there is an association relationship between A and B.

In the description of the embodiments of the disclosure, a term "correspondence" may mean that there is a direct correspondence relationship or an indirect correspondence relationship between two objects, or may mean that there is an association relationship between the two objects, or may mean that there are relationships of indicating and being indicated, configuring and being configured, and the like.

The "STA" described in the embodiments of the disclosure may be "non-AP STA".

In the embodiments of the disclosure, predefinition may be achieved by pre-storing corresponding codes, tables, or other means that may be used to indicate relevant information in devices (e.g., including APs and STAs), and a specific implementation is not limited in the disclosure. For example, predefinition may be defined in a protocol.

In order to understand the technical solutions in the embodiments of the disclosure, relevant terms of the disclosure are explained below.

An association identifier (AID) is used for identifying a terminal associated with an AP.

Medium access control (MAC) is an abbreviation of medium access control address.

A transmission opportunity (TXOP) refers to a period of time during which a terminal holding the TXOP may initiate one or more transmissions proactively.

WLAN Sensing senses people or objects in an environment by measuring a change in a WLAN signal which is scattered and/or reflected via people or objects. That is to say, WLAN Sensing measures and senses surrounding environment through a wireless signal, to implement many functions such as detecting whether there is someone invading, moving, falling in the indoor environment, or doing posture recognition, or doing establishment of spatial three-dimensional images or the like.

WLAN devices which participate in WLAN Sensing may include the following roles: sensing session initiator (which is also referred to as sensing initiator), sensing session responder (which is also referred to as sensing responder), sensing signal transmitter (which is also referred to as a sensing transmitter), sensing signal receiver (which is also referred to as sensing receiver), sensing processor and sensing session participant (which is also referred to as a sensing participant).

The sensing initiator is a device that initiates a sensing session and wants to obtain sensing result(s).

The sensing responder is a device rather than the sensing initiator participating in the sensing session.

The sensing transmitter is a device which initiates a sensing measurement signal.

The sensing receiver is a device which receives the sensing measurement signal.

The sensing processor is a device that processes the sensing measurement result(s).

The sensing participants include the sensing initiator, the sensing transmitter, and the sensing receiver.

A WLAN terminal may have one or more roles in a sensing session. For example, the sensing initiator may be only a sensing initiator, or may also be a sensing transmitter, or may also be a sensing receiver, or may also be both a sensing transmitter and a sensing receiver.

Figure 2:
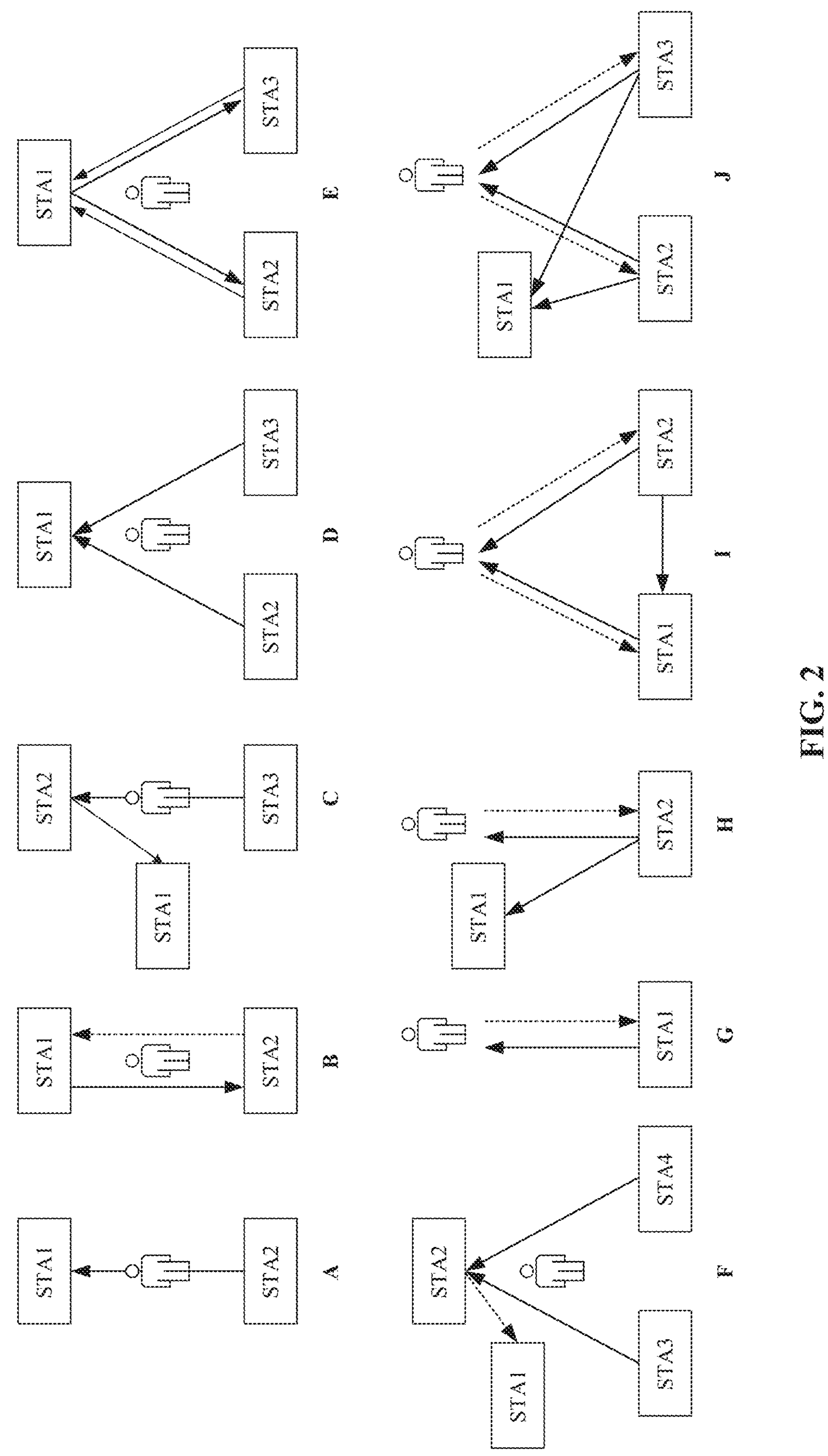
FIG. 2 is a schematic diagram of a wireless fidelity (Wi-Fi) sensing process.

For example, as shown by A in FIG. 2, STA1 may be a sensing initiator, a sensing receiver, or a sensing processor; and STA2 may be a sensing transmitter.

For another example, as shown by B in FIG. 2, STA1 may be a sensing initiator or a sensing transmitter, and STA2 may be a sensing receiver or a sensing processor.

For another example, as shown by C in FIG. 2, STA1 may be a sensing initiator or a sensing processor, and STA2 may be a sensing receiver; and STA3 may be a sensing transmitter.

For another example, as shown by D in FIG. 2, STA1 may be a sensing initiator, a sensing receiver or a sensing processor, and STA2 may be a sensing transmitter; and STA3 may be a sensing transmitter.

For another example, as shown by E in FIG. 2, STA1 may be a sensing initiator, a sensing transmitter or a sensing processor, STA2 may be a sensing receiver, and STA3 may be a sensing receiver.

For another example, as shown by F in FIG. 2, STA1 may be a sensing initiator, STA2 may be a sensing receiver or a sensing processor; STA3 may be a sensing transmitter, and STA4 may be a sensing transmitter.

For another example, as shown by G in FIG. 2, STA1 may be a sensing initiator, a sensing transmitter, a sensing receiver or a sensing processor.

For another example, as shown by H in FIG. 2, STA1 may be a sensing initiator, STA2 may be a sensing transmitter, a sensing receiver or a sensing processor.

For another example, as shown by I in FIG. 2, STA1 may be a sensing initiator, a sensing transmitter, a sensing Receiver or a sensing processor, and STA2 may be a sensing transmitter or a sensing receiver.

For another example, as shown by J in FIG. 2, STA1 may be a sensing initiator or a sensing processor, STA2 may be a sensing transmitter or a sensing receiver, and STA3 may be a sensing transmitter or a sensing receiver.

It should be noted that FIG. 2 is only an example of the disclosure and should not be understood as a limitation of the disclosure. For example, STA1, STA2 and STA3 in FIG. 2 only represent roles of STAs, which are not used to limit the number of STAs in FIG. 2 and subsequent sensing session, measurement and other operations. For example, the roles represented by STA1, STA2 and STA3 may be implemented as one or more STAs.

In some embodiments, there may be multiple sensing types, for example, a sensing type based on channel state information (CSI), i.e. CSI-based Sensing, and a sensing type based on a reflection signal, i.e. Radar-based sensing. The CSI-based sensing obtains a sensing measurement result by processing CSI of a received sensing measurement signal. The radar-based sensing obtains a sensing measurement result by processing a reflection signal of a received sensing measurement signal.

A WLAN sensing session includes one or more of the following stages: session setup, sensing measurement, sensing reporting, and session termination.

In the session setup stage, a sensing session is set up, a sensing session participant and a role (including a sensing transmitter and a sensing receiver) thereof are determined, an operation parameter related to the sensing session is determined, and the parameter is optionally interacted between terminals.

In the sensing measurement stage, sensing measurement is implemented, and the sensing transmitter(s) send sensing signal(s) to the sensing receiver(s).

In the sensing reporting stage, measurement result(s) are reported, and the sensing receiver(s) determine whether to report the measurement result(s) to a sensing initiator depending on an application scenario.

In the session termination stage, the terminal stops measuring, and terminates the sensing session.

When setting up a sensing session, the terminals may negotiate sensing roles and operational parameters, or the terminal may declare its roles and operational parameters (for example, through a beacon frame or other special frame).

The data amount of a sensing measurement result is relatively large, for example, the amount of CSI data measured in one measurement may reach 4K~40K bits. In order to reduce a network load caused by reporting the sensing measurement result(s), a measurement threshold may be set. When a change between a current sensing measurement result and a previous sensing measurement result is less than the measurement threshold, the sensing receiver reports the sensing measurement result. Otherwise, the sensing measurement result is not reported.

The sensing initiator may set multiple sets of measurement parameters, and one set of measurement parameters (which is identified by measurement setup ID and equivalent to Burst Group) may be applied to multiple measurements (which is identified by a measurement instance ID and equivalent to Burst).

In the related art, there is no discussion yet on how to perform a sensing measurement configuration, such as how to set up the sensing measurement configuration and how to terminate the sensing measurement configuration.

In view of this, the embodiments of the disclosure provide a solution for managing a sensing measurement configuration. For example, an AP device may set up a sensing measurement configuration in a process of setting up a sensing session, or set up the sensing measurement configuration in a process of setting up a sensing measurement configuration, thereby setting up the sensing measurement configuration.

In order to facilitate understanding of the technical solutions in the embodiments of the disclosure, the technical solutions of the disclosure are described in detail below with reference to specific embodiments. The related technologies as an optional solution may be arbitrarily combined with the technical solutions in the embodiments of the disclosure, and all of them belong to the protection scope of the embodiments of the disclosure. The embodiments of the disclosure include at least some of the following content.

Figures 3, 4:
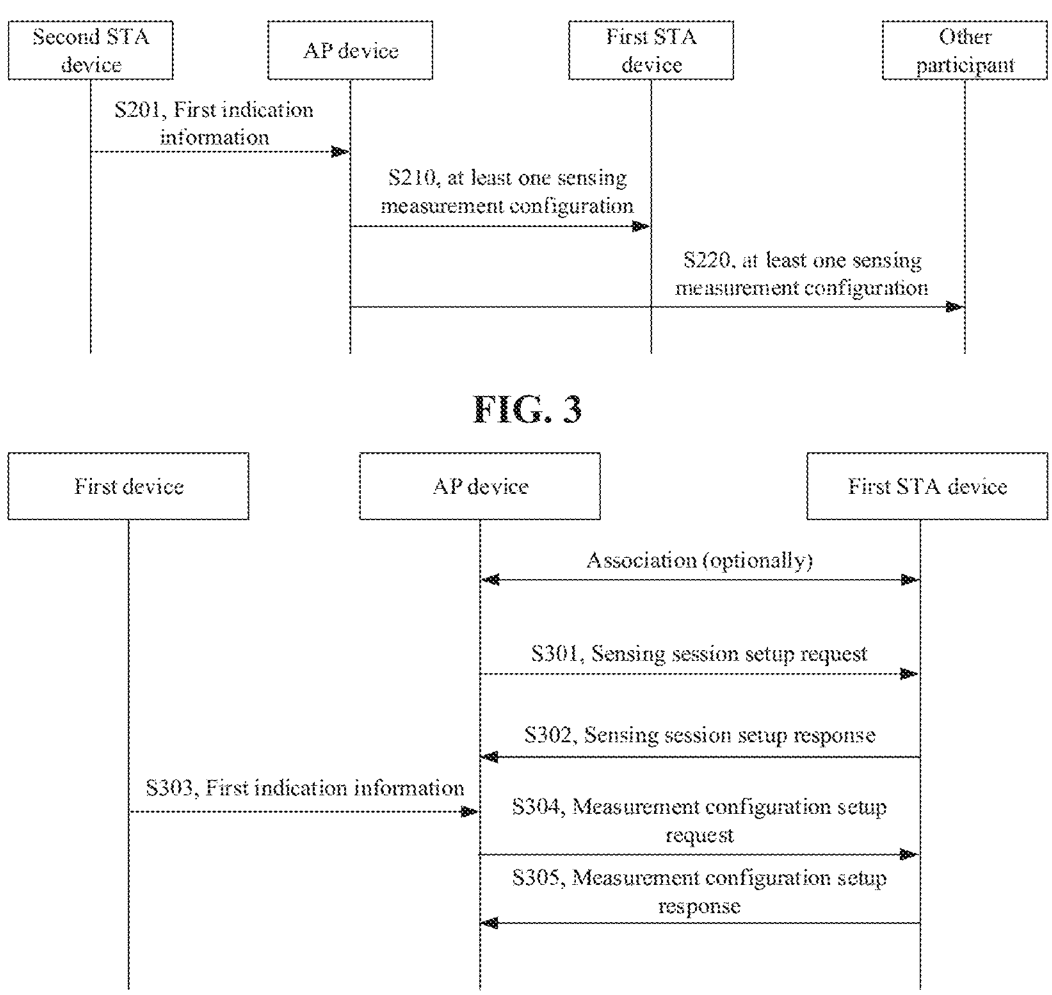
FIG. 3 is a schematic diagram of a method for wireless communication according to an embodiment of the disclosure.
FIG. 4 is a schematic interactive diagram of a method for setting up sensing measurement according to an embodiment of the disclosure.

FIG. 3 is a schematic flowchart of a method 200 for wireless communication according to an embodiment of the disclosure. As shown in FIG. 3, the method 200 includes at least the operation S210.

At S210, an access point (AP) device sends at least one sensing measurement configuration to a first station (STA) device. The sensing measurement configuration is used for configuring operational parameters of a sensing measurement. In some embodiments, the first STA device is a STA device supporting the sensing function.

In some embodiments, the first STA device is a participant of the sensing measurement, i.e. a sensing participant, e.g. a sensing transmitter or a sensing receiver.

It should be understood that the number of sensing participants may be one or more in the embodiments of the disclosure. The sensing participant is also referred as a sensing member device or a member device.

In some embodiments, when the number of sensing participants is multiple, the method 200 further includes the operation S220.

At S220, the AP device sends at least one sensing measurement configuration to other sensing participants.

It should be understood that the sensing measurement configuration is also referred as measurement configuration in the embodiments of the disclosure.

In some embodiments of the disclosure, the AP device may be a sensing initiator, which is denoted as scenario 1.

For example, the AP device may send at least one sensing measurement configuration to at least one sensing participant when determining to set up a sensing measurement configuration.

In other embodiments of the disclosure, the AP device is a proxy device of a sensing initiator, which is denoted as scenario 2.

For example, the sensing initiator is a second STA device, and the AP device may act as a proxy for the second STA device to set up a sensing measurement configuration when the second STA device determines to set up a sensing measurement configuration.

In some implementations, when determining to establish the sensing measurement configuration, the second STA device sends second indication information to the AP device, and the second indication information indicates that the AP device acts as a proxy for the second STA device to set up a sensing measurement configuration.

Optionally, the second indication information may indicate an application type of a sensing session corresponding to a sensing measurement configuration to be established, and/or a sensing measurement configuration expected (or preferred, enforced) by the second STA device.

In some embodiments, the second indication information may be the first indication information described below. The first indication information is used for triggering the AP device to set up the sensing measurement configuration.

In summary, the AP device may initiate the setup of the sensing measurement configuration itself, or may, as a proxy for other devices, initiate the setup of the sensing measurement configuration. The specific implementations of the setup of the sensing measurement configuration by the AP device are described below, and the specific implementations are applicable to any triggering method of the setup of the sensing measurement configuration by the AP device, including but not limited to the scenario 1 and the scenario 2 above.

In some embodiments, the sensing measurement configuration includes operational parameters of the sensing measurement and an identification of the sensing measurement configuration, which is also referred as Measurement Setup ID.

In some embodiments, the operational parameters of the sensing measurement include at least one of the following information: sensing role(s), measurement report types, a bandwidth, and the number of antennas of the first STA device in the sensing measurement.

That is, when setting up the sensing measurement configuration, the AP device may indicate, to the sensing participant, the following information of the sensing participant in the sensing measurement: role information, type information of measurement report to be measured and related parameters for performing the sensing measurement (e.g., bandwidth, the number of antennas, etc.).

In some embodiments, information about the sensing role(s) of the first STA device in the sensing measurement is one of the following information.

The first STA device acts as a sensing receiver in the sensing measurement.

The first STA device acts as a sensing transmitter in the sensing measurement.

The first STA device acts as a sensing receiver and a sensing transmitter in the sensing measurement.

In some embodiments, types of a measurement result may include at least one of the following: Signal to Interference plus Noise Ratio (SINR), Reference Signal Receiving Power (RSRP), Reference Signal Receiving Quality (RSRQ), signal-to-noise ratio (SNR), or Channel State Information Matrix (CSI Matrix).

In some embodiments, the at least one sensing measurement configuration may be in a granularity of a sensing session (i.e., application types of sensing sessions are not differentiated, or sensing sessions of all application types correspond to a same sensing measurement configuration), or may be in an application type granularity of a sensing session.

Optionally, a sensing measurement configuration including all sensing participants may be set up for a sensing session of a first application type. For example, the at least one sensing measurement configuration includes one sensing measurement configuration corresponding to the sensing session of the first application type, and the one sensing measurement configuration corresponds to all sensing participants.

Optionally, multiple sensing measurement configurations may be set up for a sensing session of a second application type, and each of the multiple sensing measurement configurations may include a part or all of the sensing participants. For example, the at least one sensing measurement configuration may include multiple sensing measurement configurations corresponding to the sensing session of the second application type, and each sensing measurement configuration information corresponds to a part or all of the sensing participants.

In some embodiments of the disclosure, the sensing session is used for managing the participants of the sensing measurement. For example, the AP device may bind the participant and at least one sensing measurement configuration when setting up a sensing session, and release the sensing measurement configuration bound to the participant at a termination of the sensing session.

In some embodiments of the disclosure, the sensing measurement configuration is used for managing the operational parameters of the sensing measurement. For example, one or more participants are bound to a same set of operational parameters when setting up a sensing measurement configuration (measurement setup), and the one or more participants are unbound from the set of operational parameters corresponding to the sensing measurement configuration when terminating the sensing measurement configuration (measurement termination).

In a first embodiment, the at least one sensing measurement configuration is sent by the AP device during a sensing session setup stage.

That is, the AP device may set up a binding relationship between a sensing participant and at least one sensing measurement configuration when setting up a sensing session.

In other words, in the first embodiment, the sensing session setup stage is used for setting up the sensing session and setting up the sensing measurement configuration.

For example, the AP device sends the at least one sensing measurement configuration to the first STA device through a first request frame, and the first request frame is used for requesting setting up a sensing session.

Specifically, for example, a Station Management Entity (SME) of the AP device sends the first request frame to set up a sensing session between the AP device and the first STA device.

In some embodiments, the first request frame is also referred as a sensing session setup request frame.

In some embodiments, the first request frame further includes at least one of the following: an application type corresponding to a sensing session to be set up, or information about time to live corresponding to the sensing session to be set up.

That is, the AP device may indicate one or more application types (Use Case KPI) of sensing or time to live of the sensing session when requesting setting up the sensing session.

In some embodiments, the application types may include, but are not limited to, at least one of: a detection of person presence, a detection of person quantity, a detection of person position, a posture detection, a vital sign detection or a sleep detection.

In some embodiments, the sensing session may be explicitly terminated, for example, by a sensing session termination frame. Alternatively, the sensing session may also be implicitly terminated, for example, the sensing session is terminated when the time to live of the sensing session is reached.

In embodiment 1-1, the sensing session setup stage is initiated by the AP device in association with the first STA device. That is, in the embodiment 1-1, the sensing session setup stage is initiated by the AP device, or the sensing session setup stage is initiated by the first STA device.

For example, the AP device may automatically initiate a sensing session setup stage after establishing an association with a first STA device that supports a sensing function, and set up a sensing session between the AP device and the first STA device. Optionally, the AP device indicates at least one sensing measurement configuration to the first STA device during the sensing session setup stage. For example, the AP device may send the at least one sensing measurement configuration through a sensing session setup request frame.

For another example, the first STA device supporting the sensing function automatically initiates a sensing session setup stage after establishing an association with an AP device, and set up a sensing session between the first STA device and the AP device. Optionally, the AP device indicates the at least one sensing measurement configuration to the first STA device during the sensing session setup stage. For example, the AP device may send the at least one sensing measurement configuration through a sensing session setup response frame.

In the embodiment 1-1, the at least one sensing measurement configuration is sharable for a sensing measurement initiated by a device rather than the first device. The first device is the sensing initiator of the at least one sensing measurement configuration.

That is, the sensing measurement configuration sent during the sensing session setup stage is sharable.

It should be understood that, in some embodiments, if the sensing measurement configuration is triggered and established by a first upper layer application of the first device, the sensing measurement configuration is sharable means it is sharable for an application rather than the first upper layer application, for example, is sharable for a second upper layer application of the first device, or is also sharable for an upper layer application of a second device.

It should be understood that, in some embodiments, if the sensing measurement configuration is triggered and established by the first upper layer application of the first device, a sensing measurement configuration is not sharable means it is not sharable for the application rather than the first upper layer application, for example, is not sharable for the second upper layer application of the first device, or, neither sharable for the second upper layer application of the first device nor sharable for the upper layer application of the second device.

In some embodiments, the first device may be the AP device, or may be a second STA device.

For example, the AP device sends at least one sensing measurement configuration during a sensing session setup stage, and the at least one sensing measurement configuration is triggered and established by a first upper layer application of the first device. When a second upper layer application initiates a sensing measurement, the at least one sensing measurement configuration may be used by the second upper layer application. The first upper layer application and the second upper layer application are different.

In some embodiments, the sensing measurement configuration which is sharable terminates as the sensing session terminates. That is, a lifecycle of the sensing measurement configuration is the same as a lifecycle of the sensing session to which the sensing measurement configuration belongs when setting up the sensing measurement configuration.

In the embodiment 1-2, the sensing session setup stage is initiated by the AP device in a case that the AP device is not associated with the first STA device. For example, in the embodiment 1-2, the sensing session setup stage is initiated by the AP device, or the sensing session setup stage is initiated by the first STA device.

As an example, the AP device may automatically initiate a sensing session setup stage when a sensing measurement configuration is to be set up, and set up a sensing session between the AP device and the first STA device. Optionally, the AP device indicates the at least one sensing measurement configuration to the first STA device during the sensing session setup stage. For example, the AP device may send the at least one sensing measurement configuration through a sensing session setup request frame. In a usage scenario, for example, that the AP device needs to set up sensing measurement configurations with three sensing responders, but there are only two sensing responders in a current system (or there are only two sensing responders associated with the AP device), the AP device broadcasts or unicasts a sensing session setup request frame to request an unassociated STA device which supports the sensing function to inform the AP device of its sensing capability information and to participate in the measurement. The unassociated first STA device which supports the sensing function may respond a sensing session setup response frame to the AP device, thereby setting up a sensing session with the AP device.

As another example, the first STA device which supports the sensing function automatically initiates a sensing session setup stage after discovering the AP device, and set up a sensing session between the first STA device and the AP device. Optionally, the AP device indicates the at least one sensing measurement configuration to the first STA device during the sensing session setup stage. For example, the AP device may send the at least one sensing measurement configuration through a sensing session setup response frame. A usage scenario is, for example, that the first STA device which supports the sensing function sends a sensing session setup request frame to the AP device after discovering the AP device, to inform the AP device of the sensing capability information of the first STA device and that the first STA device desires to participate in subsequent sensing measurement.

In some embodiments, the sensing capability information of the first STA device may refer to sensing measurement capabilities of the first STA device, for example, including but not limited to at least one of:

- information about the sensing role(s) supported by the first STA device;
- information about the type(s) of measurement report supported by the first STA device;
- information about the bandwidth supported by the first STA device;
- information about the number of antennas supported by the first STA device; or
- information about the sensing type(s) supported by the first STA device.

Regarding the information about the sensing role(s), the information about the type(s) of measurement report, the information about the bandwidth, the information about the number of antennas, and the information about sensing type(s), reference can be made to the relevant description in the embodiments above and are not be repeated here.

In the embodiments 1-2, the at least one sensing measurement configuration is sharable for a sensing measurement initiated by a device rather than the first device. The first device is a sensing initiator of the at least one sensing measurement configuration.

That is, the sensing measurement configuration sent during the sensing session setup stage is sharable.

It should be understood that, in some embodiments, if the sensing measurement configuration is triggered and established by a first upper layer application of the first device, the sensing measurement configuration which is sharable means it can is sharable for an application rather than the first upper layer application, for example, sharable for a second upper layer application of the first device, or is also sharable for an upper layer application of a second device.

It should be understood that, in some embodiments, if the sensing measurement configuration is triggered and established by the first upper layer application of the first device, a sensing measurement configuration which is not sharable means it is not sharable for the application rather than the first upper layer application, for example, it is not sharable for the second upper layer application of the first device, or, neither sharable for the second upper layer application of the first device nor sharable for the upper layer application of the second device.

In some embodiments, the first device may be the AP device, or may be a second STA device.

For example, the AP device sends at least one sensing measurement configuration during a sensing session setup stage, and the at least one sensing measurement configuration is triggered and established by a first upper layer application of the first device. When a second upper layer application initiates a sensing measurement, the at least one sensing measurement configuration may be used by the second upper layer application. The first upper layer application and the second upper layer application are different.

In some embodiments, the sensing measurement configuration which is sharable terminates as the sensing session terminates. That is, a lifecycle of the sensing measurement configuration is the same as a lifecycle of the sensing session to which the sensing measurement configuration belongs when setting up the sensing measurement configuration.

In the embodiment 1-3, the sensing session setup stage is initiated by the AP device based on a first indication information of the first device. The first indication information is used for triggering the AP device to set up a sensing measurement configuration.

That is, the sensing session setup stage may be initiated by the AP device based on a trigger of the first indication information.

In some embodiments, the first device may be the AP device, or may be a second STA device.

For example, an upper layer application of the AP device may trigger the AP device to set up a sensing measurement configuration.

For another example, an upper layer application of the second STA device may trigger the AP device to set up the sensing measurement configuration.

In some embodiments, the upper layer application may refer to an application (such as a Wi-Fi driver, wpa_supplicant tool applications, a mobile phone application and the like) above the MAC layer, which is not limited in the disclosure.

In some embodiments, the first indication information is further used for indicating an application type of a sensing session corresponding to at least one sensing measurement configuration to be set up, and/or information of member devices for performing the sensing measurement.

That is, when the first device triggers setting up the sensing measurement configuration, the first device may also indicate an application type of a sensing session to which the sensing measurement configuration to be set up belongs, and/or information of sensing participants for performing the sensing measurement. As an example, identification(s) of the sensing participant(s), for example an Associated ID (AID), an Unassociated ID (UID), or a MAC address.

It should be understood that regarding the application types of the sensing session in the disclosure, reference may be made to the examples of the application types above and are not be repeated here for the sake of brevity.

As an implementation, in the embodiment 1-3, the at least one sensing measurement configuration is not sharable for a sensing measurement initiated by a device rather than the first device. That is, a sensing measurement configuration set up based on the triggering of the upper application is not sharable.

As another implementation, in the embodiment 1-3, the at least one sensing measurement configuration includes sharing indication information, and the sharing indication information is used for indicating whether the sensing measurement configuration is sharable for the sensing measurement initiated by the device rather than the first device. That is, whether the sensing measurement configuration set up based on the triggering of the upper layer application is sharable is configurable.

For example, when the AP device sets up the sensing measurement configuration based on the trigger of the upper layer application, the AP device also indicates whether the sensing measurement configuration is shareable.

Optionally, in some embodiments of the disclosure, the shareable sensing measurement configuration may be terminated when the sensing session terminates rather than by the upper application, and the non-shareable sensing measurement configuration may be terminated by the upper application that triggers setting up the sensing measurement configuration, or may be terminate when the sensing session terminates.

In some embodiments, each of the at least one sensing measurement configuration corresponds to one piece of sharing indication information, and each piece of sharing indication information is used for indicating whether a sensing measurement configuration corresponding to the piece of sharing indication information is shareable.

In other embodiments, all the at least one sensing measurement configuration corresponds to one piece of sharing indication information, and the sharing indication information is used for indicating whether all the at least one sensing measurement configuration is shareable.

That is, sharing manners of the at least one sensing measurement configuration may be independently configured or may be the same.

In some embodiments, the method 200 further includes the following operation.

The AP device receives response information of the first STA device relative to the at least one sensing measurement configuration.

In some embodiments, the response information includes at least one of: information about whether the first STA device agrees with the at least one sensing measurement configuration, or reason information why the first STA device disagrees with the at least one sensing measurement configuration.

As an example, the reason information why the first STA device disagrees with the at least one sensing measurement configuration may include, but is not limited to, at least one of the following reasons:

The first STA device does not support a measurement result type indicated in the sensing measurement configuration, or the first STA device does not support role information indicated in the sensing measurement configuration, or the first STA device does not support a bandwidth indicated in the sensing measurement configuration, or the first STA device does not support the number of antennas indicated in the sensing measurement configuration.

In some embodiments, the response information of the first STA device relative to the at least one sensing measurement configuration may be sent through a first response frame, and the first response frame is a response frame of the first request frame, that is, the first response frame may be a sensing session setup response frame.

In a second embodiment, the at least one sensing measurement configuration is sent by the AP device during a sensing measurement configuration stage.

In the above first embodiment, the sensing measurement configuration is set up during the sensing session setup stage. Therefore, the sensing measurement configuration stage may not be included. In the second embodiment, the sensing measurement configuration stage may be included for setting up the sensing measurement configuration. That is, in an embodiment of the disclosure, the setup of the sensing measurement configuration may be performed through a separate stage or may also be performed in other stages, such as the sensing session setup stage.

Optionally, in the second embodiment, if there is a sensing session between the AP device and the first STA device, the sensing measurement configuration may be set up in the existing sensing session, or a new sensing session may be set up between the AP device and the first STA device, and then the sensing measurement configuration may be set up in the new sensing session.

For example, the at least one sensing measurement configuration is sent through a second request frame, and the second request frame is used for requesting setting up the sensing measurement configuration.

In some embodiments, the second request frame is also referred as a sensing measurement configuration setup request frame, and a measurement configuration setup request frame.

In some embodiments, the AP device sends the at least one sensing measurement configuration to the first STA device based on the first indication information of the first device. The first indication information is used for triggering the AP device to set up the sensing measurement configuration, and the first device is a sensing initiator of the at least one sensing measurement configuration.

That is, the AP device may execute a sensing measurement configuration procedure upon receiving the first indication information.

In the second embodiment, the first device may be the AP device, or may be a second STA device.

For example, an upper layer application of the AP device may trigger the AP device to set up a sensing measurement configuration.

For another example, an upper layer application of the second STA device may trigger the AP device to set up the sensing measurement configuration.

In some embodiments, the upper layer application may refer to an application (such as a Wi-Fi driver, wpa_supplicant tool based applications, a mobile phone application) above the MAC layer, which is not limited in the disclosure.

In some embodiments, the first indication information is further used for indicating an application type of a sensing session corresponding to at least one sensing measurement configuration to be set up, and/or information of member devices for performing the sensing measurement.

That is, when the first device triggers setting up the sensing measurement configuration, the first device may also indicate an application type of a sensing session to which the sensing measurement configuration to be set up belongs, and/or information of sensing participants for performing the sensing measurement. As an example, identification(s) of the sensing participant(s) for example an Associated ID (AID), an Unassociated ID (UID), and a MAC address.

It should be understood that regarding the application types of the sensing session in the disclosure, reference may be made to the examples of the application types above and are not be repeated here for the sake of brevity.

Optionally, in the second embodiment, if the application type(s) of the existing sensing session(s) between the AP device and the first STA device does not include an application type indicated by the first indication information, the AP device may set up a sensing session of the application type indicated by the first indication information, and then set up a sensing measurement configuration in the sensing session.

Optionally, in the second embodiment, if the application type(s) of the existing sensing session(s) between the AP device and the first STA device includes an application type indicated by the first indication information, the AP device may set up a sensing measurement configuration in the existing sensing session(s).

Optionally, in the second embodiment, the at least one sensing measurement configuration is not sharable. That is, a sensing measurement configuration set up based on the triggering of the upper application is not sharable.

In the second embodiment, the at least one sensing measurement configuration includes sharing indication information, and the sharing indication information is used for indicating whether the sensing measurement configuration is shareable. That is, whether the sensing measurement configuration set up based on the triggering of the upper layer application is sharable is configurable.

In some embodiments, each of the at least one sensing measurement configuration corresponds to one piece of sharing indication information, and each piece of sharing indication information is used for indicating whether a sensing measurement configuration corresponding to the piece of sharing indication information is shareable.

In other embodiments, all the at least one sensing measurement configuration corresponds to one piece of sharing indication information, and the sharing indication information is used for indicating whether all the at least one sensing measurement configuration is shareable.

That is, sharing manners of the at least one sensing measurement configuration may be independently configured or may be the same.

In some embodiments of the disclosure, the method 200 further includes the following operation.

The AP device receives response information of the first STA device relative to the at least one sensing measurement configuration.

In some embodiments, the response information includes at least one of: information about whether the first STA device agrees with the at least one sensing measurement configuration, or reason information why the first STA device disagrees with the at least one sensing measurement configuration.

As an example, the reason information why the first STA device disagrees with the at least one sensing measurement configuration may include, but is not limited to, at least one of the following reasons:

The first STA device does not support the measurement result type indicated in the sensing measurement configuration, or the first STA device does not support the role information indicated in the sensing measurement configuration, or the first STA device does not support the bandwidth indicated in the sensing measurement configuration, or the first STA device does not support the number of antennas indicated in the sensing measurement configuration.

In some embodiments, the response information of the first STA device relative to the at least one sensing measurement configuration may be sent through a second response frame, and the second response frame is a response frame of the second request frame, that is, the second response frame may be a sensing measurement configuration setup response frame, also referred as a measurement configuration setup response frame.

In summary, when one or more upper layer applications of the AP device initiate sensing (i.e., the AP device is a sensing initiator), the AP device manages the sensing measurement configuration, such as setting up the sensing measurement configuration. When one or more upper layer applications of the STA device initiate sensing (i.e. the STA device is a sensing initiator), the AP device manages the sensing measurement configuration, such as setting up the sensing measurement configuration.

In some embodiments, the management for termination of the sensing measurement configuration follows a principle that the device, which creates a sensing measurement configuration, uses and releases the sensing measurement configuration, and the sharable sensing measurement configuration is released by the sensing session to which the sensing measurement configuration belongs.

For example, the sensing participant may release one or more sensing measurement configuration bound with the sensing participant.

As an example, the sensing participant may release one or more sensing measurement configuration bound with the sensing participant when entering the power saving mode.

For example, when a first upper layer application of the sensing initiator indicates terminating one or more sensing measurement configuration, the sensing participant bound to the one or more sensing measurement configuration is released if the one or more sensing measurement configuration are triggered and established by the first upper layer application and the one or more sensing measurement configuration are not shareable. Alternatively, the sensing participant bound to the one or more sensing measurement configuration is not released if the one or more sensing measurement configuration are not triggered and established by the first upper layer application or the one or more sensing measurement configuration are shareable.

In some embodiments, a binding relationship between the sensing participant and the sensing measurement configuration established during the sensing session setup may be released when the sensing session terminates (the association is released).

In some embodiments, when the relationship between the STA device and the AP device is released, the sensing session between the STA device and the AP device is automatically released, and all sensing measurement configurations bound to the STA device are released accordingly.

In some embodiments, in a case that a first upper layer application of the sensing initiator indicates removing the first STA device (i.e. removing the first STA device from all sensing measurement configurations triggered and established by the first upper layer application), if the first STA device is bound with a shareable sensing measurement configuration which is triggered and established by the first upper layer application, or if the first STA device is bound with a sensing measurement configuration which is not removed and which is triggered and established by other upper layer applications, the first STA device is only removed from all sensing measurement configurations which is not sharable and which is triggered and established by the first upper layer application, without terminating a current sensing session of the second STA device. Otherwise, the current sensing session of the second STA device is terminated.

Methods of the setup and termination of the sensing measurement configuration are illustrated in conjunction with specific examples.

1. When STA 1 and AP establishes a sensing session between STA 1 and AP, no sensing measurement configuration is bound, that is, the sensing measurement configuration is not bound. An association between STA 1 and AP has been set up, or the association may have not been set up yet.

2. When STA 2 and AP establishes a sensing session between STA 2 and AP, two sensing measurement configurations are bound, which are a sensing measurement configuration A (for application type M) and a sensing measurement configuration B (for application type P). An association between STA 2 and AP has been established, or the association may have not been established yet.

3. An upper application X indicates STA1, STA2 and AP to participate in a sharable sensing measurement of the application type M, and in this case, only the measurement configuration A is bound for STA 1 and AP.

4. When STA 3 and AP establishes a sensing session between STA 3 and AP), one sensing measurement configuration is bound, that is, the sensing measurement configuration A (for application type M). An association between STA 3 and AP has been established, or the association may have not been established yet.

5. An upper layer application Y indicates STA2, STA3 and AP to participate in a sharable sensing measurement of the application type M, and in this case, there is no need to execute a sensing measurement configuration process.

6. The upper application X indicates STA1, STA2, STA3 and AP to participate in an unsharable sensing measurement of application type Q, and in this case, a measurement configuration C (for application type Q) is bound for STA 1 and AP, STA2 and AP and STA3 and AP. The sensing measurement configuration C may be triggered and established by the upper application X.

7. The upper application Y indicates STA2, STA3 and AP to participate in a sharable sensing measurement of the application type Q, and in this case, a measurement configuration D (for application type D) is bound for STA2 and AP, and STA3 and AP.

8. The upper layer application X terminates sensing measurements of the application types M and Q. In this case, the binding relationship of STA1, STA2 and STA3 with the sensing measurement configuration C is released.

9. When STA1, STA2, STA3 terminate sensing sessions with AP, the binding relationships with the sensing measurement configuration A, the sensing measurement configuration B and the sensing measurement configuration D are terminated.

A flow of managing the sensing measurement configuration according to an embodiment of the disclosure is explained below with reference to FIG. 4 and FIG. 5.

As shown in FIG. 4, firstly and optionally, an association between the AP device and the first STA device is established.

At S301, the AP device sends a sensing session setup request frame to the first STA device.

In the embodiment, the S301 may be sent after the AP device is associated with the first STA device, which corresponds to the embodiment 1-1 above.

In a first case (denoted as case 1), the sensing session setup request frame does not include a sensing measurement configuration.

In a second case (denoted as case 2), the sensing session setup request frame includes at least one sensing measurement configuration.

Herein, regarding the specific implementation of the at least one sensing measurement configuration, reference is made to the detailed description above, and the specific implementation is not repeated here.

Optionally, the at least one sensing measurement configuration is sharable.

Optionally, the sensing session setup request frame may further indicate one or more application types (Use Case KPI) of sensing.

Optionally, the sensing session setup request frame may further indicate time to live of the sensing session.

At S302, the AP device receives a sensing session setup response frame sent by the first STA device.

For the case 1 above, the sensing session setup response frame does not include response information of the sensing measurement configuration.

For the case 2 above, the sensing session setup response frame includes the response information of the sensing measurement configuration, for example, whether the first STA device agrees with the sensing measurement configuration in the sensing session setup request frame, or the reason why the first STA device disagrees with the sensing measurement configuration in the sensing session setup request frame, etc.

At S303, the AP device receives first indication information of a first device, and the first indication information is used for triggering the AP device to set up the sensing measurement configuration.

Optionally, the first device is the AP device or a second STA device.

For example, an upper layer application of the AP device may trigger the AP device to set up a sensing measurement configuration.

For another example, an upper layer application of the second STA device may trigger the AP device to set up the sensing measurement configuration.

For the case 1 above, the AP device may perform the operation S304.

For the case 2 above, the AP device may use the established sensing measurement configuration set up in S302 without negotiating new operational parameters with the sensing participants. Optionally, in this case, the AP device may send a measurement configuration setup request to the first STA device, and the measurement configuration setup request includes a measurement configuration identification of the established sensing measurement configuration.

At S304, the AP device may send a measurement configuration setup request to the first STA device, and the measurement configuration setup request includes at least one sensing measurement configuration.

Optionally, the at least one sensing measurement configuration is not sharable.

Optionally, the at least one sensing measurement configuration is sharable or is not sharable, for example, sharing indication information is used for indicating whether the sensing measurement configuration is sharable.

At S305, the AP device receives a measurement configuration setup response frame sent by the first STA device.

The measurement configuration setup response frame includes response information of the sensing measurement configuration, for example, whether the first STA device agrees with the sensing measurement configuration in the sensing session setup request frame, or the reason why the first STA device disagrees with the sensing measurement configuration in the sensing session setup request frame, etc.

Further, the AP device may measure along with at least one sensing participant to obtain a measurement result (e.g. CSI data), and further process the measurement result to obtain a sensing result (e.g. the number of people in a target area).

Optionally, the AP device may perform one sensing measurement along with at least one sensing participant, or may perform multiple sensing measurements.

Optionally, the sensing measurement configuration may be used for one sensing measurement, or may be used for multiple sensing measurements.

Optionally, one sensing measurement may correspond to one measurement instance.

Further, if the sensing initiator is the second STA device, the AP device may further report a sensing result to the sensing initiator. For example, the AP device may report the sensing result to an upper application of the sensing initiator.

Optionally, the AP device may report a sensing result of one measurement instance at a time, or may report sensing results of multiple measurement instances.

Further, the first STA device may release one or more sensing measurement configuration bound to the first STA device due to a reason (e.g. entering a power saving mode) thereof.

Optionally, if an upper layer application of the sensing initiator indicates terminating one or more sensing measurement configuration, and the one or more sensing measurement configuration is set up by the upper layer application and is not sharable, a binding relationship between the STA device and the one or more measurement configuration is released. Otherwise, the binding relationship is not released.

In the embodiment, the binding relationship between the sensing measurement configuration and the STA device set up during the sensing session setup may be released when the sensing session terminates (or when the association between the STA device and the AP device is released).

In the embodiment, the binding relationship between the sensing participant and the sensing measurement configuration set up during the sensing session setup may be released during the sensing session terminates (the association is released).

Figure 5:
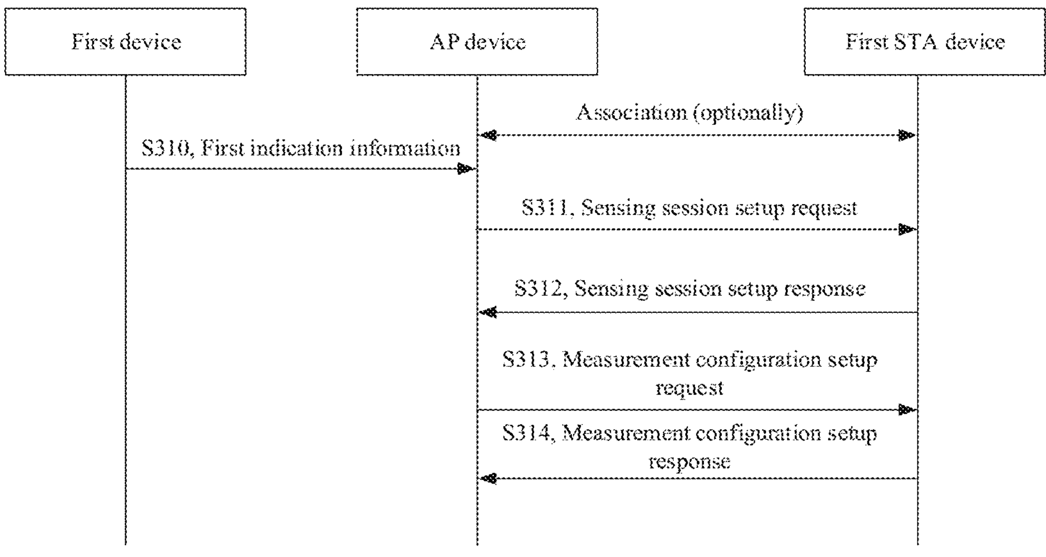
FIG. 5 is a schematic interactive diagram of a method for setting up sensing measurement according to another embodiment of the disclosure.

As shown in FIG. 5, firstly and optionally, an association between the AP device and the first STA device is established.

At S310, the AP device receives first indication information of the first device, and the first indication information is used for triggering the AP device to set up the sensing measurement configuration.

Optionally, the first device is the AP device or a second STA device.

For example, an upper layer application of the AP device may trigger the AP device to set up the sensing measurement configuration.

For another example, an upper layer application of the second STA device may trigger the AP device to set up the sensing measurement configuration.

At S311, the AP device sends a sensing session setup request frame to the first STA device.

In a first case (denoted as case 1), the sensing session setup request frame does not include the sensing measurement configuration.

In a second case (denoted as case 2), the sensing session setup request frame includes at least one sensing measurement configuration, which corresponds to the embodiment 1-3 above.

Optionally, the at least one sensing measurement configuration is sharable.

Herein, regarding the specific implementation of the at least one sensing measurement configuration, reference is made to the detailed description above, and the specific implementation is not repeated here.

Optionally, the sensing session setup request frame may further indicate one or more application types (Use Case KPI) of sensing.

Optionally, the sensing session setup request frame may further indicate time to live of the sensing session.

At S312, the AP device receives a sensing session setup response frame sent by the first STA device.

For the case 1 above, the sensing session setup response frame does not include response information of the sensing measurement configuration.

For the case 2 above, the sensing session setup response frame includes the response information of the sensing measurement configuration, for example, whether the first STA device agrees with the sensing measurement configuration in the sensing session setup request frame, or the reason why the first STA device disagrees with the sensing measurement configuration in the sensing session setup request frame, etc.

For the case 1 above, the AP device may perform the operation S313.

For the case 2 above, the AP device may use the established sensing measurement configuration set up in S311 without negotiating new operational parameters with the sensing participants. Optionally, in this case, the AP device may send a measurement configuration setup request to the first STA device, and the measurement configuration setup request includes a measurement configuration identification of the established sensing measurement configuration.

At S313, the AP device may send a measurement configuration setup request to the first STA device, and the measurement configuration setup request includes at least one sensing measurement configuration, which corresponds to the second embodiment above.

Optionally, the at least one sensing measurement configuration is not sharable.

Optionally, the at least one sensing measurement configuration is sharable or not sharable, for example, sharing indication information is used for indicating whether the sensing measurement configuration is sharable.

At S314, the AP device receives a measurement configuration setup response frame sent by the first STA device.

The measurement configuration setup response frame includes response information of the sensing measurement configuration, for example, whether the first STA device agrees with the sensing measurement configuration in the sensing session setup request frame, or the reason why the first STA device disagrees with the sensing measurement configuration in the sensing session setup request frame, etc.

Further, the AP device may measure along with at least one sensing participant to obtain a measurement result (e.g. CSI data), and further process the measurement result to obtain a sensing result (e.g. a number of people in a target area).

Optionally, the AP device may perform one sensing measurement along with at least one sensing participant, or may perform multiple sensing measurements.

Optionally, the sensing measurement configuration may be used for one sensing measurement, or may be used for multiple sensing measurements.

Optionally, one sensing measurement may correspond to one measurement instance.

Further, if the sensing initiator is the second STA device, the AP device may further report a sensing result to the sensing initiator. For example, the AP device may report the sensing result to an upper application of the sensing initiator.

Optionally, the AP device may report a sensing result of one measurement instance at a time, or may report sensing results of multiple measurement instances.

Further, the first STA device may release one or more sensing measurement configuration bound to the first STA device due to a reason (e.g. entering a power saving mode) thereof.

Optionally, if an upper layer application of the sensing initiator indicates terminating one or more sensing measurement configuration, and the one or more sensing measurement configuration is set up by the upper layer application and is not sharable, a binding relationship between the STA device and the one or more measurement configuration is released. Otherwise, the binding relationship is not released.

In the embodiment, the binding relationship between the sensing measurement configuration and the STA device set up during the sensing session setup may be released when the sensing session terminates (or when the association between the STA device and the AP device is released).

In some embodiments, in a case that a first upper layer application of the sensing initiator indicates removing the first STA device (i.e. removing the first STA device from all sensing measurement configurations triggered and established by the first upper layer application), if the first STA device is bound with a sensing measurement configuration which triggered and established by the first upper layer application and which is sharable, or if the first STA device is bound with a sensing measurement configuration which is triggered and established by other upper layer applications and which is not removed, the first STA device is only removed from all sensing measurement configurations which are triggered and established by the first upper layer application and which is not sharable, without terminating a current sensing session of the second STA device. Otherwise, the current sensing session of the second STA device is terminated.

In the embodiment, the binding relationship between the sensing measurement configuration and the STA device set up during the sensing session setup may be released when the sensing session terminates (or when the association between the STA device and the AP device is released).

Frame format designs of the first request frame and the first response frame above are described below with reference to FIG. 6 and FIG. 7.

Figure 6:
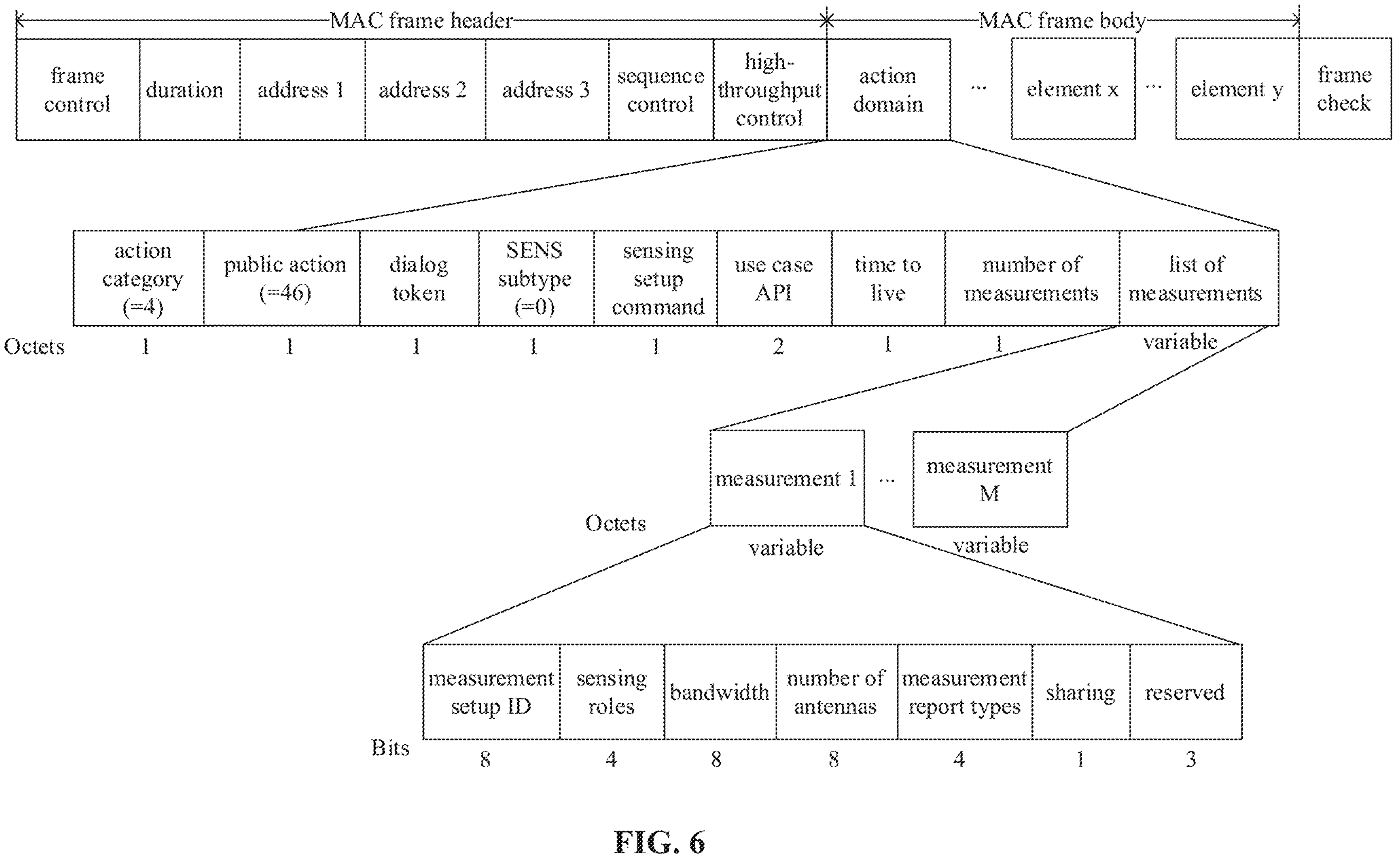
FIG. 6 is a schematic diagram of a frame format of a sensing session setup request frame according to an embodiment of the disclosure.
Figure 7:
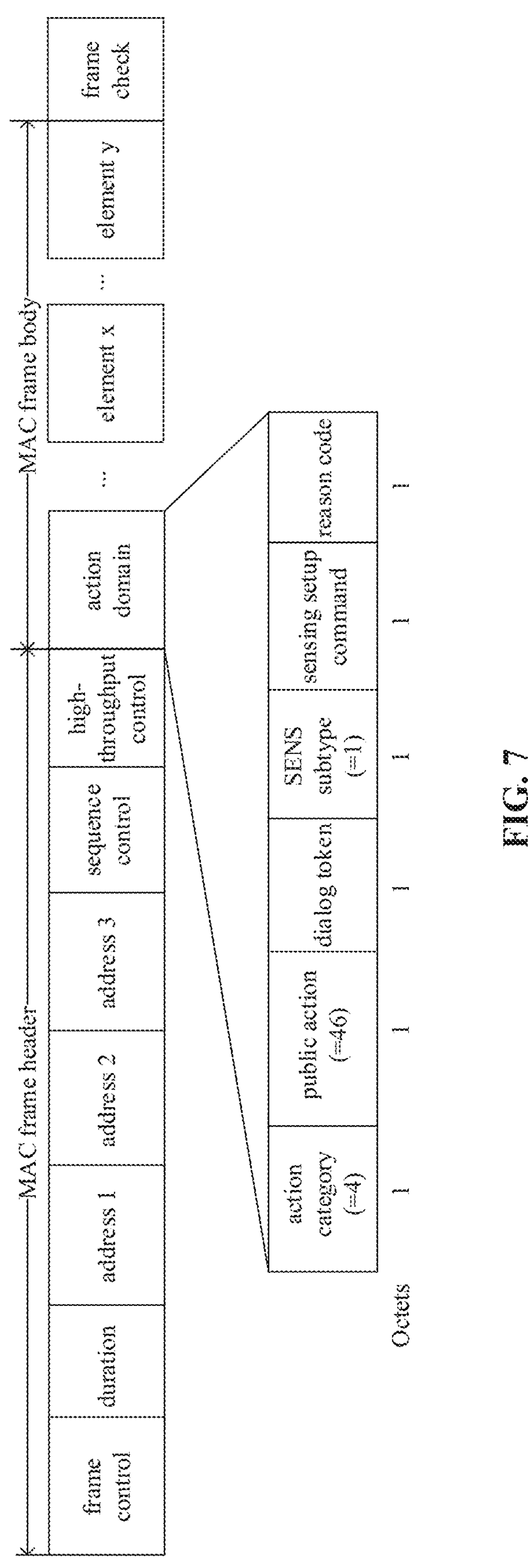
FIG. 7 is a schematic diagram of a frame format of a sensing session setup response frame according to an embodiment of the disclosure.

It should be understood that frame formats of the first request frame and the first response frame illustrated in FIG. 6 and FIG. 7 are only examples, and other frame formats obtained by transforming the frame formats according to the embodiments of the disclosure fall within the scope of protection of the disclosure, and the disclosure is not limited thereto.

In some embodiments, the first request frame is an Action frame or an action frame which requires no acknowledgement (Action No Ack frame). That is, the sensing session setup request frame may be the Action frame or the Action No Ack frame.

In some embodiments, the first response frame is an Action frame or an Action No Ack frame.

That is, the sensing session setup response frame may be the Action frame or the Action No Ack frame.

In some embodiments, at least one field in the Action frame or the Action No Ack frame may be used to indicate that the Action frame or the Action No Ack frame is the sensing session setup request frame or the sensing session setup response frame.

Therefore, the first request frame and the first response frame may be considered as sensing action frames.

In some embodiments, the Action frame or the Action No Ack frame includes an Action field, the action field includes a Category field, a public action subtype field (public action field), and a sensing subtype field (SENS subtype) field, and values of the Category field, the public action subtype field, and the SENS subtype field jointly indicates that the Action frame or the Action No Ack frame is the sensing session setup request frame or the sensing session setup response frame.

As an example, the Category field having a value of 4 indicates that the frame is a public action frame. A value of the public action field is a reserved value (for example, any value in a range from 46 to 255, and taking 46 as an example below), indicating that the frame is a sensing action frame. Further, a value of the SENS subtype indicates that the sensing action frame is a sensing session setup request frame or a sensing session setup response frame.

For example, the SENS subtype having a first value indicates that the sensing action frame is a sensing session setup request frame, and the SENS subtype having a second value indicates that the sensing action frame is a sensing session setup response frame. The first value and the second value are different.

As an example, the first value is 0, and the second value is 1.

FIG. 6 is a schematic diagram of a frame format of a sensing session setup request frame according to an embodiment of the disclosure. In the frame format, the Category field having a value of 4 indicates that the frame is a public action frame, the public action field having a value of 46 indicates that the frame is a sensing action frame, and the SENS subtype having a value of 0 indicates that the frame is a sensing session setup request frame.

In some embodiments, as shown in FIG. 6, the sensing session setup request frame may further include at least one of the following fields.

It should be understood that correspondences between the meanings and values of the following fields are only examples, as long as each meaning corresponds to a unique value, and the disclosure is not limited thereto.

A Dialog Token field indicates a session identification of a sensing session to be set up.

A Setup Command field indicates a configuration manner of a sensing measurement configuration in a sensing session setup request frame. As an example, a value of 0 represents “demand”, and a value of 1 represents “suggest”.

An application type (Use Case API) field indicates a sensing usage type.

As an example, 0 represents a person presence detection, 1 represents a person quantity detection, 2 represents a person position detection, 3 represents a posture detection, 4 represents a vital sign detection, and 5 represents a sleep detection.

A Time to Live field indicates time to live of a session. When the time to live is reached, the session terminates automatically.

For example, a value of 1 represents 1 minute, a value of 2 represents 10 minutes, a value of 3 represents 1 hour, a value of 4 represents 12 hours, and the like.

A Number of Measurements field indicates the number of measurement configurations contained in a measurement configuration list field.

A Measurement Setup ID field indicates an identification of a measurement configuration.

A roles field indicates the role(s) of a peer device in a sensing measurement.

For example, a value of 0 represents a sensing receiver, a value of 1 represents a sensing transmitter, and a value of 2 represents both a sensing receiver and a sensing transmitter.

A measurement report types field indicates a data type of a measurement result.

For example, a value of 0 represents channel state information (CSI), a value of 1 represents beam signal-to-noise ratio (beam SNR), etc.

A bandwidth field indicates a bandwidth used for measurement.

For example, a value of 1 represents 20 Mhz, a value of 2 represents 40 Mhz, a value of 3 represents 80 Mhz, a value of 4 represents 160 Mhz, a value of 5 represents 320 Mhz, etc.

A number of antennas field indicates the number of antennas used for measurement.

For example, a value of X represents X antennas, and X may be 1~16.

A Sharing field indicates whether the measurement configuration may be used by other upper layer applications (rather than the creator). For example, a value of 0 represents that the measurement configuration is not sharable, and a value of 1 represents that the measurement configuration is sharable.

FIG. 7 is a schematic diagram of a frame format of a sensing session setup response frame according to an embodiment of the disclosure. In the frame format, the Category field having a value of 4 indicates that the frame is a public action frame, the public action field having a value of 46 indicates that the frame is a sensing action frame, and the SEN subtype having a value of 1 indicates that the frame is a sensing session setup response frame.

In some embodiments, as shown in FIG. 7, the sensing session setup response frame may further include at least one of the following fields.

It should be understood that correspondences between the meanings and values of the following fields are only examples, as long as each meaning corresponds to a unique value, and the disclosure is not limited thereto.

A Setup Command field indicates feedback for a sensing measurement configuration in a sensing session setup request. For example, a value of 0 represents “Accept” and a value of 1 represents “Reject”.

A Reason Code field is contained in the sensing session setup response frame when the value of the Setup Command indicates “Reject”. Otherwise, the sensing session setup response frame does not include the Reason Code field.

For example, a value of 0 represents that the measurement report types indicated in the sensing session setup request is not supported. A value of 1 represents that the roles indicated in the sensing session setup request is not supported. A value of 2 represents that the bandwidth indicated in the sensing session setup request is not supported. A value of 3 represents that the number of antennas indicated in the sensing session setup request is not supported, etc.

Frame format designs of the second request frame and the second response frame above are described below with reference to FIG. 8 and FIG. 9.

Figure 8:
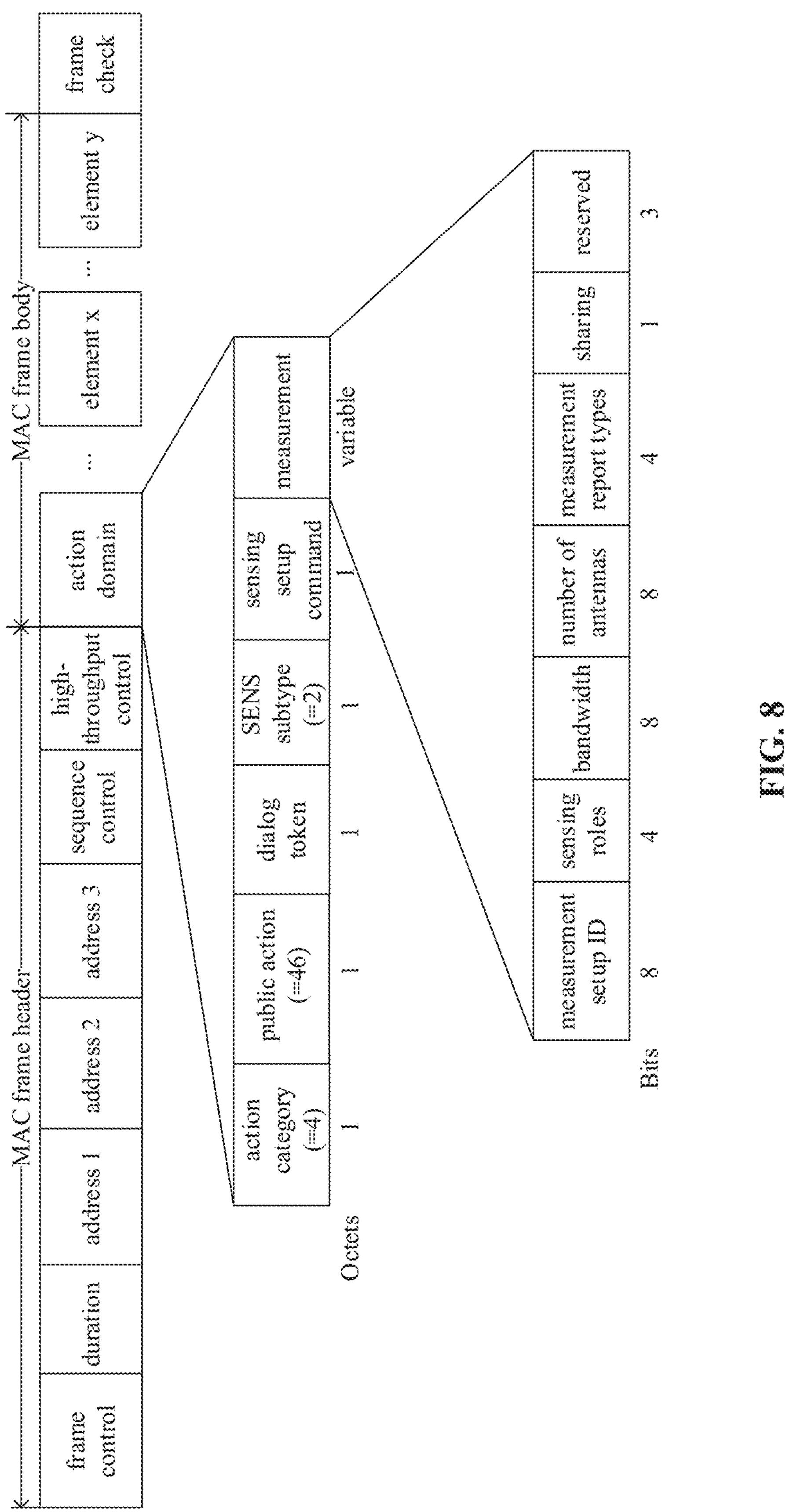
FIG. 8 is a schematic diagram of a frame format of a measurement configuration setup request frame according to an embodiment of the disclosure.
Figure 9:
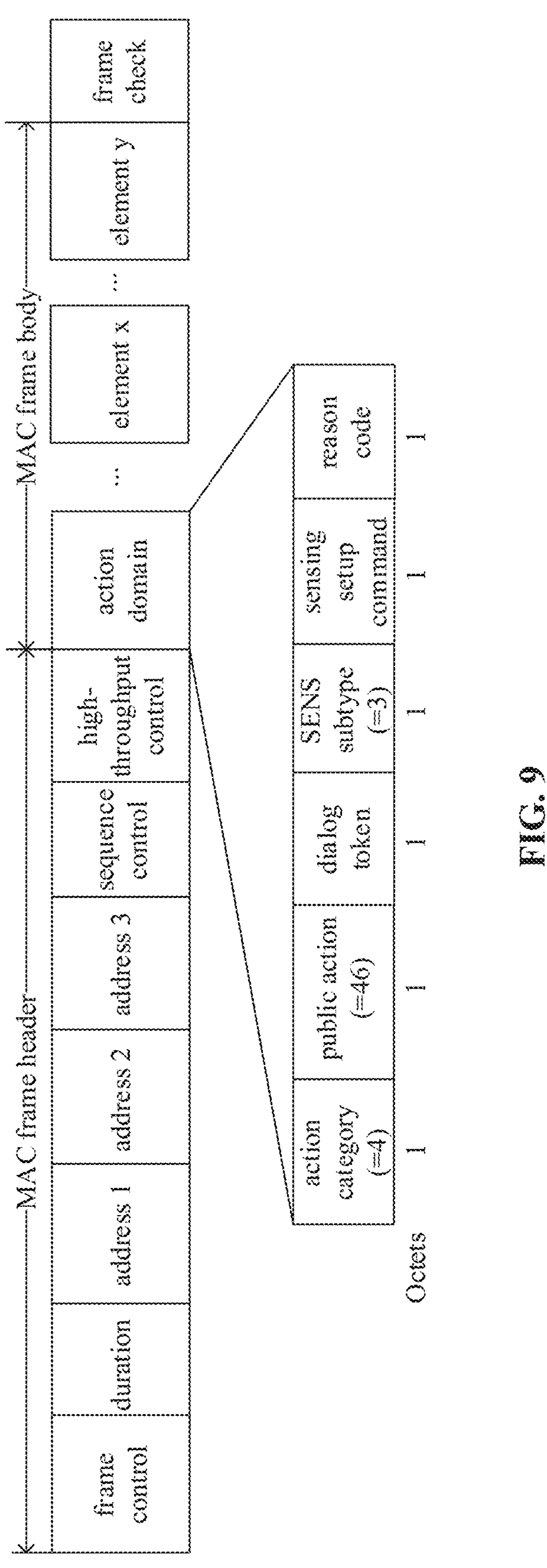
FIG. 9 is a schematic diagram of a frame format of a measurement configuration setup response frame according to an embodiment of the disclosure.

It should be understood that frame formats of the second request frame and the second response frame illustrated in FIG. 8 and FIG. 9 are only examples, and other frame formats obtained by transforming the frame formats according to the embodiments of the disclosure fall within the scope of protection of the disclosure, and the disclosure is not limited thereto.

In some embodiments, the second request frame is an Action frame or an Action No Ack frame. That is, the measurement configuration setup request frame may be the Action frame or the Action No Ack frame.

In some embodiments, the second response frame is an Action frame or an Action No Ack frame.

That is, the measurement configuration setup response frame may be the Action frame or the Action No Ack frame.

In some embodiments, at least one field in the Action frame or the Action No Ack frame may be used to indicate that the Action frame or the Action No Ack frame is the measurement configuration setup request frame or the measurement configuration setup response frame.

Therefore, the second request frame and the second response frame may be considered as sensing action frames.

In some embodiments, the Action frame or the Action No Ack frame includes an Action field, the Action field includes a Category field, a public action subtype field (public action field), and a sensing subtype field (SENS subtype) field, and values of the Category field, the public action field, and the SENS subtype field jointly indicates that the Action frame or the Action No Ack frame is the measurement configuration setup request frame or the measurement configuration setup response frame.

As an example, the Category field having a value of 4 indicates that the frame is a public action frame. A value of the public action field is a reserved value (for example, any value in a range from 46 to 255, and taking 46 as an example below), indicating that the frame is a sensing action frame. Further, a value of the SENS subtype indicates that the sensing action frame is a measurement configuration setup request frame or a measurement configuration setup response frame.

For example, the SENS subtype having a third value indicates that the sensing action frame is a measurement configuration setup request frame, and the SENS subtype having a fourth value indicates that the sensing action frame is a measurement configuration setup response frame. The third value and the fourth value are different.

As an example, the third value is 2, and the fourth value is 3.

FIG. 8 is a schematic diagram of a frame format of a measurement configuration setup request frame according to an embodiment of the disclosure. In the frame format, the Category field having a value of 4 indicates that the frame is a public action frame, the public action field having a value of 46 indicates that the frame is a sensing action frame, and the SENS subtype having a value of 2 indicates that the frame is a measurement configuration setup request frame.

In some embodiments, as shown in FIG. 8, the measurement configuration setup request frame may further include at least one of the following fields.

It should be understood that correspondences between the meanings and values of the following fields are only examples, as long as each meaning corresponds to a unique value, and the disclosure is not limited thereto.

A Setup Command field indicates a configuration manner of a sensing measurement configuration in a measurement configuration setup request frame. As an example, a value of 0 represents “demand”, and a value of 1 represents “suggest”.

A Number of Measurements field indicates a set of operational parameters corresponding to a measurement configuration.

A Measurement Setup ID field indicates an identification of a measurement configuration.

A roles field indicates the role(s) of a peer device in a sensing measurement.

For example, a value of 0 represents a sensing receiver, a value of 1 represents a sensing transmitter, and a value of 2 represents both a sensing receiver and a sensing transmitter.

A measurement report types field indicates a data type of a measurement result.

For example, a value of 0 represents channel state information (CSI), a value of 1 represents beam signal-to-noise ratio (beam SNR), etc.

A bandwidth field indicates a bandwidth used for measurement.

For example, a value of 1 represents 20 Mhz, a value of 2 represents 40 Mhz, a value of 3 represents 80 Mhz, a value of 4 represents 160 Mhz, a value of 5 represents 320 Mhz, etc.

A number of antennas field indicates the number of antennas used for measurement.

For example, a value of X represents X antennas, and X may range from 1 to 16.

A Sharing field indicates whether the measurement configuration may be used by other upper layer applications (rather than the creator). For example, a value of 0 represents that the measurement configuration is not sharable, and a value of 1 represents that the measurement configuration is sharable.

FIG. 9 is a schematic diagram of a frame format of a measurement configuration setup response frame according to an embodiment of the disclosure. In the frame format, the Category field having a value of 4 indicates that the frame is a public action frame, the public action field having a value of 46 indicates that the frame is a sensing action frame, and the SENS subtype having a value of 3 indicates that the frame is a measurement configuration setup response frame.

In some embodiments, as shown in FIG. 9, the measurement configuration setup response frame may further include at least one of the following fields.

It should be understood that correspondences between the meanings and values of the following fields are only examples, as long as each meaning corresponds to a unique value, and the disclosure is not limited thereto.

A Setup Command field indicates feedback to a sensing measurement configuration in a measurement configuration setup request. For example, a value of 0 represents “Accept” and a value of 1 represents “Reject”.

A Reason Code field is contained in the sensing session setup response frame when the value of the Setup Command indicates “Reject”. Otherwise, the sensing session setup response frame does not include the Reason Code field.

For example, a value of 0 represents that the measurement report types indicated in the sensing session setup request is not supported. A value of 1 represents that the roles indicated in the sensing session setup request is not supported. A value of 2 represents that the bandwidth indicated in the sensing session setup request is not supported. A value of 3 represents that the number of antennas indicated in the sensing session setup request is not supported, etc.

In summary, when one or more upper layer applications of the AP device trigger a sensing measurement setup, the AP device sets up a sensing measurement configuration. When one or more upper layer applications of a STA device initiate a sensing measurement setup, the AP device acts as a proxy to set up the sensing measurement configuration.

For example, the AP device may perform the sensing measurement setup during the sensing session setup stage, or may perform the sensing measurement setup through a separate sensing measurement setup process.

For the management for terminating the sensing measurement configuration follows a principle that the device, which creates a sensing measurement configuration, uses and releases the sensing measurement configuration, and the sharable sensing measurement configuration is released by the sensing session to which the sensing measurement configuration belongs.

The method embodiments of the disclosure are described in detail above with reference to FIG. 3 to FIG. 9, and the device embodiments of the disclosure are described in detail below with reference to FIG. 10 to FIG. 14. It should be understood that the device embodiments and the method embodiments correspond to each other, and similar descriptions may refer to the method embodiments.

Figure 10:
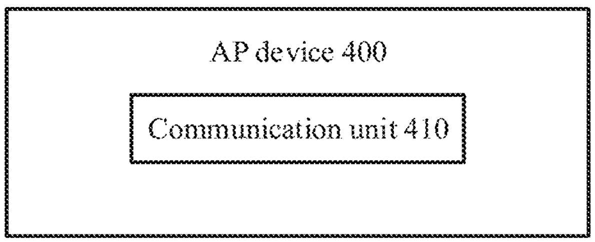
FIG. 10 is a schematic block diagram of an access point (AP) device according to an embodiment of the disclosure.

FIG. 10 illustrates a schematic block diagram of an access point (AP) device 400 according to an embodiment of the disclosure. As shown in FIG. 10, the AP device 400 includes a communication unit 410.

The communication unit 410 is configured to send at least one sensing measurement configuration to a first station (STA) device. The sensing measurement configuration is used for configuring operational parameters of a sensing measurement.

In some embodiments of the disclosure, the sensing measurement configuration includes at least one of the operational parameters of the sensing measurement, or an identification of the sensing measurement configuration.

In some embodiments of the disclosure, the operational parameters of the sensing measurement include at least one of the following information: a sensing role, measurement report types, a bandwidth, and the number of antennas of the first STA device in the sensing measurement.

In some embodiments of the disclosure, the AP device is a sensing initiator, or the AP device is a proxy device of the sensing initiator.

In some embodiments of the disclosure, the at least one sensing measurement configuration is sent by the AP device during a sensing session setup stage.

In some embodiments of the disclosure, the at least one sensing measurement configuration is sent through a first request frame, and the first request frame is used for requesting setting up a sensing session.

In some embodiments of the disclosure, the first request frame further includes at least one of: an application type corresponding to a sensing session to be set up, or information of time to live corresponding to the sensing session to be set up.

In some embodiments of the disclosure, the sensing session setup stage is initiated by the AP device in association with the first STA device.

In some embodiments of the disclosure, a sensing initiator of the at least one sensing measurement configuration is a first device, and the at least one sensing measurement configuration is sharable for a sensing measurement initiated by a device rather than the first device.

In some embodiments of the disclosure, the sensing session setup stage is initiated by the AP device based on first indication information of a first device, the first indication information is used for triggering the AP device to set up the sensing measurement configuration, and the first device is a sensing initiator of the at least one sensing measurement configuration.

In some embodiments of the disclosure, the at least one sensing measurement configuration is not sharable for a sensing measurement initiated by a device rather than the first device.

Alternatively, the at least one sensing measurement configuration includes sharing indication information, and the sharing indication information is used for indicating whether the sensing measurement configuration is sharable for the sensing measurement initiated by the device rather than the first device.

In some embodiments of the disclosure, the at least one sensing measurement configuration is sent by the AP device during a sensing measurement configuration stage.

In some embodiments of the disclosure, the at least one sensing measurement configuration is sent through a second request frame, and the second request frame is used for requesting setting up the sensing measurement configuration.

In some embodiments of the disclosure, the operation that the AP device sends the at least one sensing measurement configuration to the first STA device includes the following operation.

The AP device sends the at least one sensing measurement configuration to the first STA device according to a first indication information of a first device. The first indication information is used for triggering the AP device to set up the sensing measurement configuration, and the first device is a sensing initiator of the at least one sensing measurement configuration.

In some embodiments of the disclosure, the at least one sensing measurement configuration is not sharable for a sensing measurement initiated by a device rather than the first device.

Alternatively, the at least one sensing measurement configuration includes sharing indication information, and the sharing indication information is used for indicating whether the sensing measurement configuration is sharable for the sensing measurement initiated by the device rather than the first device.

In some embodiments of the disclosure, the first indication information is further used for indicating at least one of an application type of a sensing session corresponding to a sensing measurement configuration to be set up, or information of a member device which performs the sensing measurement.

In some embodiments of the disclosure, the at least one sensing measurement configuration includes one sensing measurement configuration corresponding to a sensing session of a first application type, and the one sensing measurement configuration corresponds to all sensing participants.

Alternatively, the at least one sensing measurement configuration includes multiple sensing measurement configurations corresponding to a sensing session of a second application type, and each of the multiple sensing measurement configurations corresponds to a part or all of the sensing participants.

In some embodiments of the disclosure, the first request frame is an Action frame or an Action No Ack frame.

In some embodiments of the disclosure, the first request frame includes an Action field, the Action field includes a Category field, a public action subtype field, and a sensing subtype field, and values of the Category field, the public action subtype field, and the sensing subtype field jointly indicates that the first request frame is a sensing session setup request frame.

In some embodiments of the disclosure, the second request frame is an action frame or an Action No Ack frame.

In some embodiments of the disclosure, the second request frame includes an Action field, the Action field includes a Category field, a public action subtype field, and a sensing subtype field, and values of the Category field, the public action subtype field, and the sensing subtype field jointly indicates that the second request frame is a measurement configuration setup request frame.

Optionally, in some embodiments, the above communication unit may be a communication interface or transceiver, or an input/output interface of a communication chip or a system-on-chip. The processing unit above may be one or more processors.

It should be understood that the AP device 400 according to the embodiments of the disclosure may correspond to the AP device in the method embodiments of the disclosure, and the above and other operations and/or functions of the units in the AP device 400 are respectively to implement the corresponding operations of the AP device in the method 200 shown in FIG. 3 to FIG. 9. These are not repeated here for the sake of brevity.

Figure 11:
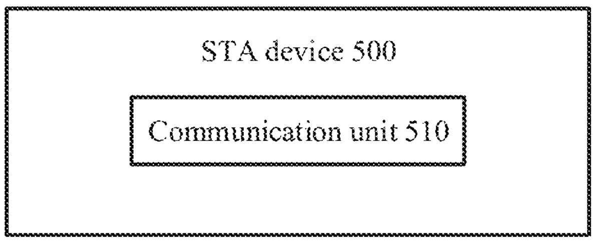
FIG. 11 is a schematic block diagram of a station (STA) device according to an embodiment of the disclosure.

FIG. 11 is a schematic block diagram of a station (STA) device according to an embodiment of the disclosure. The STA device 500 in FIG. 11 includes a communication unit 510.

The communication unit 510 is configured to receive at least one sensing measurement configuration sent by an access point (AP) device. The sensing measurement configuration is used for configuring operational parameters of a sensing measurement.

In some embodiments of the disclosure, the sensing measurement configuration includes operational parameters of sensing measurement and an identification of the sensing measurement configuration.

In some embodiments of the disclosure, the operational parameters of the sensing measurement include at least one of the sensing role(s), the measurement report type(s), the bandwidth, and the number of antennas of the STA device in the sensing measurement.

In some embodiments of the disclosure, the AP device is a sensing initiator, or the AP device is a proxy device of the sensing initiator.

In some embodiments of the disclosure, the at least one sensing measurement configuration is sent by the AP device during a sensing session setup stage.

In some embodiments of the disclosure, the at least one sensing measurement configuration is sent through a first request frame, and the first request frame is used for requesting setting up a sensing session.

In some embodiments of the disclosure, the first request frame further includes at least one of an application type corresponding to a sensing session to be set up, or information of time to live corresponding to the sensing session to be set up.

In some embodiments of the disclosure, the sensing session setup stage is initiated by the AP device in association with the STA device.

In some embodiments of the disclosure, a sensing initiator of the at least one sensing measurement configuration is a first device, and the at least one sensing measurement configuration is sharable for a sensing measurement initiated by a device rather than the first device.

In some embodiments of the disclosure, the sensing session setup stage is initiated by the AP device based on first indication information of a first device, and the first indication information is used for triggering the AP device to set up the sensing measurement configuration.

In some embodiments of the disclosure, a sensing initiator of the at least one sensing measurement configuration is the first device, and the at least one sensing measurement configuration is not sharable for a sensing measurement initiated by a device rather than the first device.

Alternatively, the at least one sensing measurement configuration includes sharing indication information, and the sharing indication information is used for indicating whether the sensing measurement configuration is sharable for the sensing measurement initiated by the device rather than the first device.

In some embodiments of the disclosure, the at least one sensing measurement configuration is sent by the AP device during a sensing measurement configuration stage.

In some embodiments of the disclosure, the at least one sensing measurement configuration is sent through a second request frame, and the second request frame is used for requesting setting up the sensing measurement configuration.

In some embodiments of the disclosure, the at least one sensing measurement configuration is sent by the AP device according to first indication information of a first device. The first indication information is used for triggering the AP device to set up the sensing measurement configuration, and the first device is a sensing initiator of the at least one sensing measurement configuration.

In some embodiments of the disclosure, the at least one sensing measurement configuration is not sharable for a sensing measurement initiated by a device rather than the first device.

Alternatively, the at least one sensing measurement configuration includes sharing indication information, and the sharing indication information is used for indicating whether the sensing measurement configuration is sharable for the sensing measurement initiated by the device rather than the first device.

In some embodiments of the disclosure, the first indication information is further used for indicating at least one of an application type of a sensing session corresponding to a sensing measurement configuration to be set up, or information of a member device which performs the sensing measurement.

In some embodiments of the disclosure, the at least one sensing measurement configuration includes one sensing measurement configuration corresponding to a sensing session of a first application type, and the one sensing measurement configuration corresponds to all sensing participants.

Alternatively, the at least one sensing measurement configuration includes multiple sensing measurement configurations corresponding to a sensing session of a second application type, and each of the multiple sensing measurement configurations corresponds to a part or all of the sensing participants.

In some embodiments of the disclosure, the first request frame is an action frame or Action No Ack frame frame.

In some embodiments of the disclosure, the first request frame includes an Action field, the Action field includes a Category field, a public action subtype field, and a sensing subtype field, and values of the Category field, the public action subtype field, and the sensing subtype field jointly indicates that the first request frame is a sensing session setup request frame.

In some embodiments of the disclosure, the second request frame is an action frame or an Action No Ack frame.

In some embodiments of the disclosure, the second request frame includes an Action field, the Action field includes a Category field, a public action subtype field, and a sensing subtype field, and values of the Category field, the public action subtype field, and the sensing subtype field jointly indicates that the second request frame is a measurement configuration setup request frame.

In some embodiments of the disclosure, the first device is the AP device, or the first device is a second STA device.

Optionally, in some embodiments, the communication unit above may be a communication interface or transceiver, or an input/output interface of a communication chip or a system-on-chip. The processing unit above may be one or more processors.

It should be understood that the STA device 500 according to the embodiments of the disclosure may correspond to the first STA device in the method embodiments of the disclosure, and the above and other operations and/or functions of each units in the STA device 500 are respectively to implement the corresponding operations of the first STA device in the method 200 shown in FIG. 3 to FIG. 9. These are not repeated here for the sake of brevity.

Figure 12:
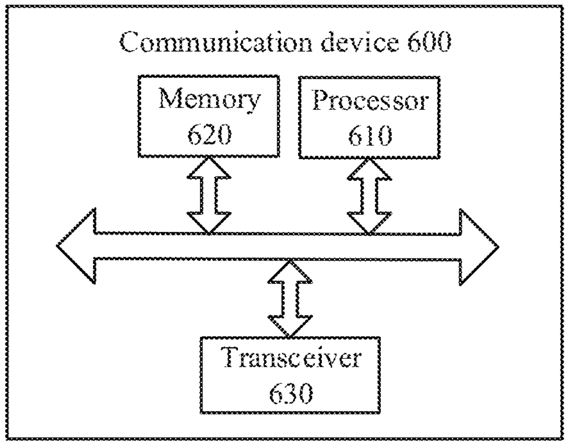
FIG. 12 is a schematic block diagram of a communication device according to an embodiment of the disclosure.

FIG. 12 is a schematic structural diagram of a communication device 600 according to an embodiment of the disclosure. The communication device 600 shown in FIG. 12 includes a processor 610, and the processor 610 may invoke and run a computer program from memory to implement the methods in the embodiments of the disclosure.

Optionally, as shown in FIG. 12, the communication device 600 may further include a memory 620. The processor 610 may invoke and run a computer program from the memory 620 to implement the methods in the embodiments of the disclosure.

The memory 620 may be a separate device independent of the processor 610, or may be integrated into the processor 610.

Optionally, as shown in FIG. 12, the communication device 600 may further include a transceiver 630. The processor 610 may control the transceiver 630 to communicate with other devices, in particular sending information or data to other devices, or to receiving information or data from other devices.

Herein the transceiver 630 may include a transmitter and a receiver. The transceiver 630 may further include antennas, and the number of antennas may be one or more.

Optionally, the communication device 600 may be the first STA device in the embodiments of the disclosure, and the communication device 600 may implement the corresponding processes executed by the first STA device in the various methods of the embodiments of the disclosure, which is not repeated here for the sake of brevity.

Optionally, the communication device 600 may be the AP device in the embodiments of the disclosure, and the communication device 600 may implement the corresponding processes executed by the AP device in the various methods of the embodiments of the disclosure, which is not repeated here for the sake of brevity.

Figure 13:
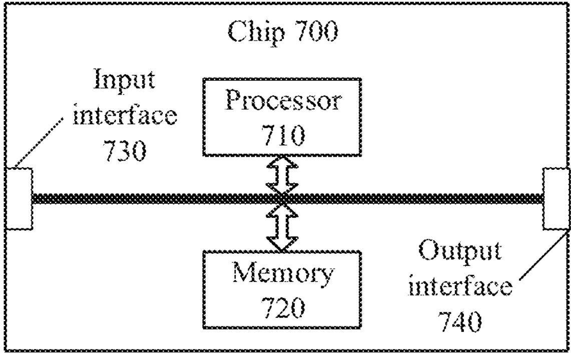
FIG. 13 is a schematic block diagram of a chip according to an embodiment of the disclosure.

FIG. 13 is a schematic structural diagram of a chip according to an embodiment of the disclosure. A chip 700 shown in FIG. 13 includes a processor 710, and the processor may invoke and run a computer program from a memory to implement the methods in embodiments of the disclosure.

Optionally, as shown in FIG. 13, the chip 700 may further include a memory 720. The processor 710 may invoke and run a computer program from the memory 720 to implement the methods in the embodiments of the disclosure.

Herein the memory 720 may be a separate device independent of the processor 710, or may be integrated into the processor 710.

Optionally, the chip 700 may further include an input interface 730. The processor 710 may control the input interface 730 to communicate with other devices or chips, in particular obtaining information or data from other devices or chips.

Optionally, the chip 700 may further include an output interface 740. Herein the processor 710 may control the output interface 740 to communicate with other devices or chips, in particular outputting information or data to other devices or chips.

Optionally, the chip may be applied to the first STA device in the embodiments of the disclosure, and the chip may implement the corresponding processes executed by the first STA device in the various methods of the embodiments of the disclosure, which is not repeated here for the sake of brevity.

Optionally, the chip may be applied to the AP device in the embodiments of the disclosure, and the chip may implement the corresponding processes executed by the AP device in the various methods of the embodiments of the disclosure, which is not repeated here for the sake of brevity.

It should be understood that the chip in the embodiments of the disclosure may also be referred as a system level chip, a system chip, a chip system or a system-on-chip, etc.

Figure 14:
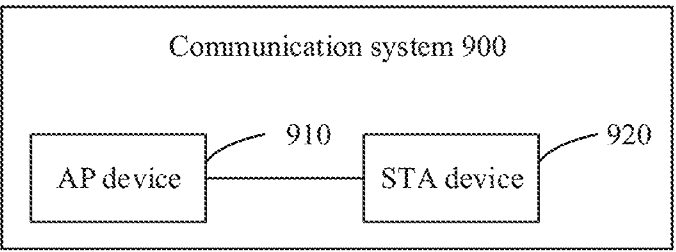
FIG. 14 is a schematic block diagram of a communication system according to an embodiment of the disclosure.

FIG. 14 is a schematic block diagram of a communication system 900 according to an embodiment of the disclosure. As shown in FIG. 14, the communication system 900 includes an access point (AP) device 910 and a station (STA) device 920.

Herein the AP device 910 may be configured to implement the corresponding functions realized by the AP device in the methods above, and the STA device 920 may be configured to implement the corresponding functions realized by the first STA device in the methods above, which will not be repeated here for the sake of brevity.

It should be understood that the processor in the embodiments of the disclosure may be an integrated circuit chip having signal processing capability. In the implementation process, each step of the above method embodiments may be accomplished by an integrated logic circuit of hardware or by an instruction in form of software in the processor. The above processor may be a general purpose processor, a Digital Signal Processor (DSP), an Application Specific Integrated Circuit (ASIC), a Field Programmable Gate Array (FPGA), or other programmable logic device, discrete gate or transistor logic device, discrete hardware component. The processor may implement or perform the methods, operations, and logical block diagrams disclosed in the embodiments of the disclosure. The general purpose processor may be a microprocessor or any conventional processor or the like. The operations of the methods disclosed in the embodiments of the disclosure may be directly accomplished by the hardware decoding processor, or be accomplished by a combination of hardware and software modules in the decoding processor. The software module may be located in a Random Access Memory (RAM), a flash memory, a Read-Only Memory (ROM), a Programmable ROM (PROM) or an Electrically Erasable PROM (EEPROM), a register and other storage medium mature in the art. The storage medium is located in the memory, and the processor reads information in the memory to implement the operations of the methods above in combination with the hardware.

It may be understood that the memory in the embodiments of the disclosure may be a transitory memory or a non-transitory memory, or may include both the transitory memory and the non-transitory memory. The non-transitory memory may be a ROM, a PROM, an Erasable PROM (EPROM), an EEPROM, or a flash memory. The transitory memory may be a RAM that used as an external cache. By way of illustration but not limitation, many forms of RAMs may be available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that the above memory is an example but not a limiting description. For example, the memory in the embodiments of the disclosure may also be a SRAM, a DRAM, a SDRAM, a DDR SDRAM, an ESDRAM, a SLDRAM, a DR RAM, and the like. That is, the memories in the embodiments of the disclosure are intended to include, but are not limited to, these and any other suitable types of memories.

A computer-readable storage medium configured to store computer programs is further provided according to an embodiment of the disclosure.

Optionally, the computer-readable storage medium may be applied to the AP device in the embodiments of the disclosure, and the computer programs enable the computer to execute the corresponding processes executed by the AP device in the various methods of the embodiments of the disclosure, which is not be repeated here for the sake of brevity.

Optionally, the computer-readable storage medium may be applied to the STA device in the embodiments of the disclosure, and the computer programs enable the computer to execute the corresponding processes executed by the STA device in the various methods of the embodiments of the disclosure, which is not be repeated here for the sake of brevity.

A computer program product including computer program instructions is further provided according to an embodiment of the disclosure.

Optionally, the computer program product may be applied to the AP device in the embodiments of the disclosure, and the computer program instructions enable the computer to execute the corresponding processes executed by the AP device in the various methods of the embodiments of the disclosure, which is not repeated here for brevity.

Optionally, the computer program product may be applied to the STA device in the embodiments of the disclosure, and the computer program instructions enable the computer to execute the corresponding processes executed by the STA device in the various methods of the embodiments of the disclosure, which is not repeated here for brevity.

A computer program is further provided according to an embodiment of the disclosure.

Optionally, the computer program may be applied to the AP device in the embodiments of the disclosure, and the computer program is run on a computer to enable the computer to execute the corresponding processes executed by the AP device in the various methods of the embodiments of the disclosure, which is not be repeated here for the sake of brevity.

Optionally, the computer program may be applied to the STA device in the embodiments of the disclosure, and the computer program is run on a computer to enable the computer to execute the corresponding processes realized by the STA device in the various methods of the embodiments of the disclosure, which is not be repeated here for the sake of brevity.

Those skilled in the art may appreciate that the various example units and algorithm steps described in connection with the embodiments disclosed herein may be implemented in electronic hardware or a combination of computer software and electronic hardware. Whether these functions are performed in hardware or software depends on specific applications and design constraints of the technical scheme. Those skilled may use different methods for specific applications to implement the described functions, but such implementation should not be considered beyond the scope of the disclosure.

Those skilled in the art may clearly appreciate that for convenience and conciseness of description, regarding the specific operating processes of the systems, devices and units above, reference may be made to the corresponding processes in the method embodiments above and are not be repeated herein.

In the several embodiments provided in the disclosure, it should be understood that the disclosed systems, devices and methods may be implemented by other ways. For example, the device embodiments above are only illustrative. For example, the division of the units is only a logical functional division, and in practice, there may be other division manners. For example, multiple units or components may be combined or integrated into another system, or some features may be ignored or not performed. On the other hand, the coupling or direct coupling or communication connection between the units and components illustrated or discussed may be indirect coupling or communication connection through some interfaces, devices or units, and may be electrical, mechanical or other forms.

The units illustrated as separate components may or may not be physically separated, and the components displayed as units may or may not be physical units, i.e., the units and components may be located in one place, or may be distributed over multiple network units. A part or all of the units may be selected according to actual needs to achieve the objectives of the embodiments of the disclosure.

Furthermore, the functional units in the various embodiments of the disclosure may be integrated in one processing unit, or the units may exist physically individually, or two or more units may be integrated in one unit.

The functions may be stored in a computer-readable storage medium if the functions are implemented in form of software functional units and sold or used as stand-alone products. Based on such understanding, the essence of the technical solutions of the disclosure, or the part that contributes to the related technologies, or part of the technical solutions may be embodied in the form of a software product stored in a storage medium including several instructions, which to enable a computer device (which may be a personal computer, a server, or a network device, etc.) to implement all or part of the operations of the methods described in the various embodiments of the disclosure. The above storage medium includes a Universal Serial Bus (USB) flash drive, a removable hard disk, a Read-Only Memory (ROM), a Random Access Memory (RAM), a magnetic disk, an optical disk, or any other medium that may store program codes.

The descriptions above are merely specific embodiments of the disclosure, but the scope of protection of the disclosure is not limited thereto. Any change or replacement readily contemplated by a person skilled in the art within the technical scope disclosed in the disclosure shall fall within the scope of protection of the disclosure. Accordingly, the scope of protection of the disclosure shall be subject to the scope of protection of the claims.

The invention claimed is:

1. An access point (AP) device, comprising:

a processor;

a transceiver; and a memory configured to store a computer program, wherein the processor is configured to invoke and run the computer program stored in the memory to control the transceiver to send at least one sensing measurement configuration to a first station (STA) device, wherein the at least one sensing measurement configuration is used for configuring operational parameters of a sensing measurement, and wherein the at least one sensing measurement configuration comprises the operational parameters of the sensing measurement, and an identification of the sensing measurement configuration, wherein the operational parameters of the sensing measurement comprise: sensing role(s) a bandwidth, and a number of antennas of the first STA device in the sensing measurement, and the at least one sensing measurement configuration is identified by the identification of the sensing measurement configuration.

2. The AP device of claim 1, wherein the AP device is a sensing initiator, or the AP device is a proxy device of the sensing initiator.

3. The AP device of claim 1, wherein the at least one sensing measurement configuration is sent by the AP device during a sensing session setup stage and the at least one sensing measurement configuration is sent through a first request frame, and the first request frame is used for requesting setting up a sensing session, wherein the first request frame further comprises information of time to live corresponding to the sensing session to be set up.

4. The AP device of claim 1, wherein the at least one sensing measurement configuration is sent by the AP device during a sensing measurement configuration stage.

5. The AP device of claim 4, wherein the at least one sensing measurement configuration is sent by the AP device according to a first indication information of a first device, the first indication information is used for triggering the AP device to set up the at least one sensing measurement configuration, and the first device is a sensing initiator for the at least one sensing measurement configuration.

6. The AP device of claim 1, wherein a Measurement Setup ID field indicates the identification of the sensing measurement configuration.

7. A station (STA) device, comprising:

a processor;

a transceiver; and a memory configured to store a computer program, wherein the processor is configured to invoke and run the computer program stored in the memory to control the transceiver to receive at least one sensing measurement configuration sent by an access point (AP) device, wherein the at least one sensing measurement configuration is used for configuring operational parameters of a sensing measurement, and wherein the at least one sensing measurement configuration comprises the operational parameters of the sensing measurement and an identification of the sensing measurement configuration, wherein the operational parameters of the sensing measurement comprise: sensing role(s), a bandwidth, and a number of antennas of the first STA device in the sensing measurement, and at least one sensing measurement configuration is identified by the identification of the sensing measurement configuration.

8. The STA device of claim 7, wherein the AP device is a sensing initiator, or the AP device is a proxy device of the sensing initiator.

9. The STA device of claim 7, wherein the at least one sensing measurement configuration is sent by the AP device during a sensing session setup stage, and the at least one sensing measurement configuration is sent through a first request frame, and the first request frame is used for requesting setting up a sensing session.

10. The STA device of claim 9, wherein the first request frame further comprises:

information of time to live corresponding to the sensing session to be set up.

11. The STA device of claim 7, wherein the at least one sensing measurement configuration is sent by the AP device during a sensing measurement configuration stage, wherein the at least one sensing measurement configuration is sent by the AP device according to a first indication information of a first device, the first indication information is used for triggering the AP device to set up the at least one sensing measurement configuration, and the first device is a sensing initiator for the at least one sensing measurement configuration.

12. The STA device of claim 11, wherein the first device is the AP device, or the first device is a second STA device.

13. The STA device of claim 7, wherein a Measurement Setup ID field indicates the identification of the sensing measurement configuration.

14. A method for wireless communication, comprising:

receiving, by a first station (STA) device, at least one sensing measurement configuration sent by an access point (AP) device, wherein the at least one sensing measurement configuration is used for configuring operational parameters of a sensing measurement, wherein the at least one sensing measurement configuration comprises the operational parameters of the sensing measurement and an identification of the sensing measurement configuration, wherein the operational parameters of the sensing measurement comprise: sensing role(s), a bandwidth, and a number of antennas of the first STA device in the sensing measurement, and at least one sensing measurement configuration is identified by the identification of the sensing measurement configuration.

15. The method of claim 14, wherein the AP device is a sensing initiator, or the AP device is a proxy device of the sensing initiator.

16. The method of claim 15, wherein the at least one sensing measurement configuration is sent by the AP device during a sensing session setup stage, and the at least one sensing measurement configuration is sent through a first request frame, and the first request frame is used for requesting setting up a sensing session, the first request frame further comprises information of time to live corresponding to the sensing session to be set up.

17. The method of claim 14, wherein the at least one sensing measurement configuration is sent by the AP device during a sensing measurement configuration stage.

18. The method of claim 17, wherein the receiving, by the first station (STA) device, at least one sensing measurement configuration sent by an access point (AP) device comprises:

receiving, by the first STA device, at least one sensing measurement configuration which is sent by the AP device based on first indication information of a first device, wherein the first indication information is used for triggering the AP device to set up the at least sensing measurement configuration, and the first device is a sensing initiator for the at least one sensing measurement configuration.

19. The method of claim 18, wherein the first device is the AP device, or the first device is a second STA device.

20. The method of claim 14, wherein a Measurement Setup ID field indicates the identification of the sensing measurement configuration.

* * * * *